US010339365B2

(12) United States Patent
Gusarov et al.

(10) Patent No.: US 10,339,365 B2
(45) Date of Patent: Jul. 2, 2019

(54) AUTOMATED AVATAR GENERATION

(71) Applicant: Snap Inc., Santa Monica, CA (US)

(72) Inventors: Maksim Gusarov, Venice, CA (US); Igor Kudriashov, Venice, CA (US); Valerii Filev, Venice, CA (US); Sergei Kotcur, Venice, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 15/086,749

(22) Filed: Mar. 31, 2016

(65) Prior Publication Data
US 2017/0286752 A1 Oct. 5, 2017

(51) Int. Cl.
*G06K 9/00* (2006.01)
*G06T 13/40* (2011.01)

(52) U.S. Cl.
CPC .......... *G06K 9/00281* (2013.01); *G06T 13/40* (2013.01)

(58) Field of Classification Search
CPC ........... G06K 9/00221; G06K 9/00268; G06K 9/00302; G06K 9/00328
See application file for complete search history.

(56) References Cited

U.S. PATENT DOCUMENTS

| 6,038,295 | A | 3/2000 | Mattes |
| 6,283,858 | B1 * | 9/2001 | Hayes, Jr. .......... G06K 9/00268 345/418 |
| 6,980,909 | B2 | 12/2005 | Root et al. |
| 7,079,158 | B2 * | 7/2006 | Lambertsen ......... A45D 44/005 345/592 |
| 7,173,651 | B1 | 2/2007 | Knowles |
| 7,411,493 | B2 | 8/2008 | Smith |
| 7,535,469 | B2 * | 5/2009 | Kim ................... G06K 9/00234 345/419 |
| 7,535,890 | B2 | 5/2009 | Rojas |
| 8,077,931 | B1 * | 12/2011 | Chatman ............... G06T 7/0012 382/118 |
| 8,131,597 | B2 | 3/2012 | Hudetz |
| 8,199,747 | B2 | 6/2012 | Rojas et al. |
| 8,332,475 | B2 | 12/2012 | Rosen et al. |

(Continued)

FOREIGN PATENT DOCUMENTS

| CA | 2887596 A1 | 7/2015 |
| WO | 2014194439 | 12/2014 |
| WO | WO-2017173319 A1 | 10/2017 |

OTHER PUBLICATIONS

"International Application Serial No. PCT/US2017/025460, International Search Report dated Jun. 20, 2017", 2 pgs.

(Continued)

*Primary Examiner* — Wesley J Tucker
(74) *Attorney, Agent, or Firm* — Schwegman Lundberg & Woessner, P.A.

(57) ABSTRACT

Systems, devices, media, and methods are presented for generating facial representations using image segmentation with a client device. The systems and methods receive an image depicting a face, detect at least a portion of the face within the image, and identify a set of facial landmarks within the portion of the face. The systems and methods determine one or more characteristics representing the portion of the face, in response to detecting the portion of the face. Based on the one or more characteristics and the set of facial landmarks, the systems and methods generate a representation of a face.

19 Claims, 10 Drawing Sheets

(56) References Cited

U.S. PATENT DOCUMENTS

| | | | |
|---|---|---|---|
| 8,457,367 B1 | 6/2013 | Sipe et al. | |
| 8,718,333 B2 | 5/2014 | Wolf et al. | |
| 8,724,622 B2 | 5/2014 | Rojas | |
| 8,730,231 B2* | 5/2014 | Snoddy | G06Q 30/02 345/419 |
| 8,874,677 B2 | 10/2014 | Rosen et al. | |
| 8,909,679 B2 | 12/2014 | Root et al. | |
| 8,995,433 B2 | 3/2015 | Rojas | |
| 9,040,574 B2 | 5/2015 | Wang et al. | |
| 9,055,416 B2 | 6/2015 | Rosen et al. | |
| 9,100,806 B2 | 8/2015 | Rosen et al. | |
| 9,100,807 B2 | 8/2015 | Rosen et al. | |
| 9,191,776 B2 | 11/2015 | Root et al. | |
| 9,204,252 B2 | 12/2015 | Root | |
| 9,224,220 B2* | 12/2015 | Toyoda | G06T 11/203 |
| 9,443,227 B2 | 9/2016 | Evans et al. | |
| 9,489,661 B2 | 11/2016 | Evans et al. | |
| 9,491,134 B2 | 11/2016 | Rosen et al. | |
| 9,641,870 B1 | 5/2017 | Cormie et al. | |
| 2002/0067362 A1* | 6/2002 | Agostino Nocera | G06K 9/00248 345/473 |
| 2005/0162419 A1* | 7/2005 | Kim | G06T 15/00 345/419 |
| 2007/0258656 A1* | 11/2007 | Aarabi | G06K 9/00228 382/254 |
| 2008/0158222 A1* | 7/2008 | Li | G06F 17/30247 345/418 |
| 2009/0044113 A1* | 2/2009 | Jones | G06T 13/40 715/707 |
| 2009/0153552 A1 | 6/2009 | Fidaleo et al. | |
| 2009/0202114 A1* | 8/2009 | Morin | A63F 13/12 382/118 |
| 2009/0319178 A1 | 12/2009 | Khosravy et al. | |
| 2009/0328122 A1 | 12/2009 | Amento et al. | |
| 2010/0227682 A1* | 9/2010 | Reville | A63F 13/12 463/29 |
| 2011/0148864 A1* | 6/2011 | Lee | G06K 9/00221 345/419 |
| 2011/0161076 A1 | 6/2011 | Davis et al. | |
| 2011/0202598 A1 | 8/2011 | Evans et al. | |
| 2011/0249891 A1 | 10/2011 | Li | |
| 2011/0292051 A1* | 12/2011 | Nelson | G06K 9/00281 345/467 |
| 2012/0013770 A1 | 1/2012 | Stafford et al. | |
| 2012/0113106 A1* | 5/2012 | Choi | G06T 11/00 345/419 |
| 2012/0139830 A1* | 6/2012 | Hwang | G06F 3/012 345/156 |
| 2012/0209924 A1 | 8/2012 | Evans et al. | |
| 2013/0258040 A1* | 10/2013 | Kaytaz | H04N 7/157 348/14.07 |
| 2014/0043329 A1 | 2/2014 | Wang et al. | |
| 2014/0362091 A1* | 12/2014 | Bouaziz | G06T 13/40 345/473 |
| 2015/0086087 A1 | 3/2015 | Ricanek, Jr. et al. | |
| 2015/0123967 A1* | 5/2015 | Quinn | G06T 13/40 345/420 |
| 2015/0169938 A1 | 6/2015 | Yao et al. | |
| 2015/0234942 A1 | 8/2015 | Harmon | |
| 2016/0134840 A1* | 5/2016 | McCulloch | H04N 7/157 348/14.03 |
| 2017/0039752 A1* | 2/2017 | Quinn | G06T 13/40 |
| 2017/0113140 A1 | 4/2017 | Blackstock et al. | |
| 2018/0024726 A1* | 1/2018 | Hviding | G06F 3/04845 |
| 2018/0091732 A1* | 3/2018 | Wilson | H04N 5/23222 |
| 2018/0113587 A1 | 4/2018 | Allen et al. | |

OTHER PUBLICATIONS

"International Application Serial No. PCT/US2017/025460, Written Opinion dated Jun. 20, 2017", 7 pgs.

Leyden, John, "This SMS will self-destruct in 40 seconds", [Online]. Retrieved from the Internet: <URL: http://www.theregister.co.uk/2005/12/12/stealthtext/, (Dec. 12, 2005), 1 pg.

"U.S. Appl. No. 15/369,499, Non Final Office Action dated Aug. 15, 2018", 22 pgs.

"European Application Serial No. 17776809.0, Extended European Search Report dated Feb. 27, 2019", 7 pgs.

* cited by examiner

US 10,339,365 B2

AUTOMATED AVATAR GENERATION

TECHNICAL FIELD

Embodiments of the present disclosure relate generally to automate processing of images. More particularly, but not by way of limitation, the present disclosure addresses systems and methods for generating representations of a face depicted within a set of images.

BACKGROUND

Telecommunications applications and devices can provide communication between multiple users using a variety of media, such as text, images, sound recordings, and/or video recording. For example, video conferencing allows two or more individuals to communicate with each other using a combination of software applications, telecommunications devices, and a telecommunications network. Telecommunications devices may also record video streams to transmit as messages across a telecommunications network.

Currently avatars used for communication or identification purposes are often generated entirely by user selection. Avatars generated using some automation often rely on user selection of initial elements as an underlying baseline for predetermined matching operations to complete the avatar.

BRIEF DESCRIPTION OF THE DRAWINGS

Various ones of the appended drawings merely illustrate example embodiments of the present disclosure and should not be considered as limiting its scope.

Figure 1:
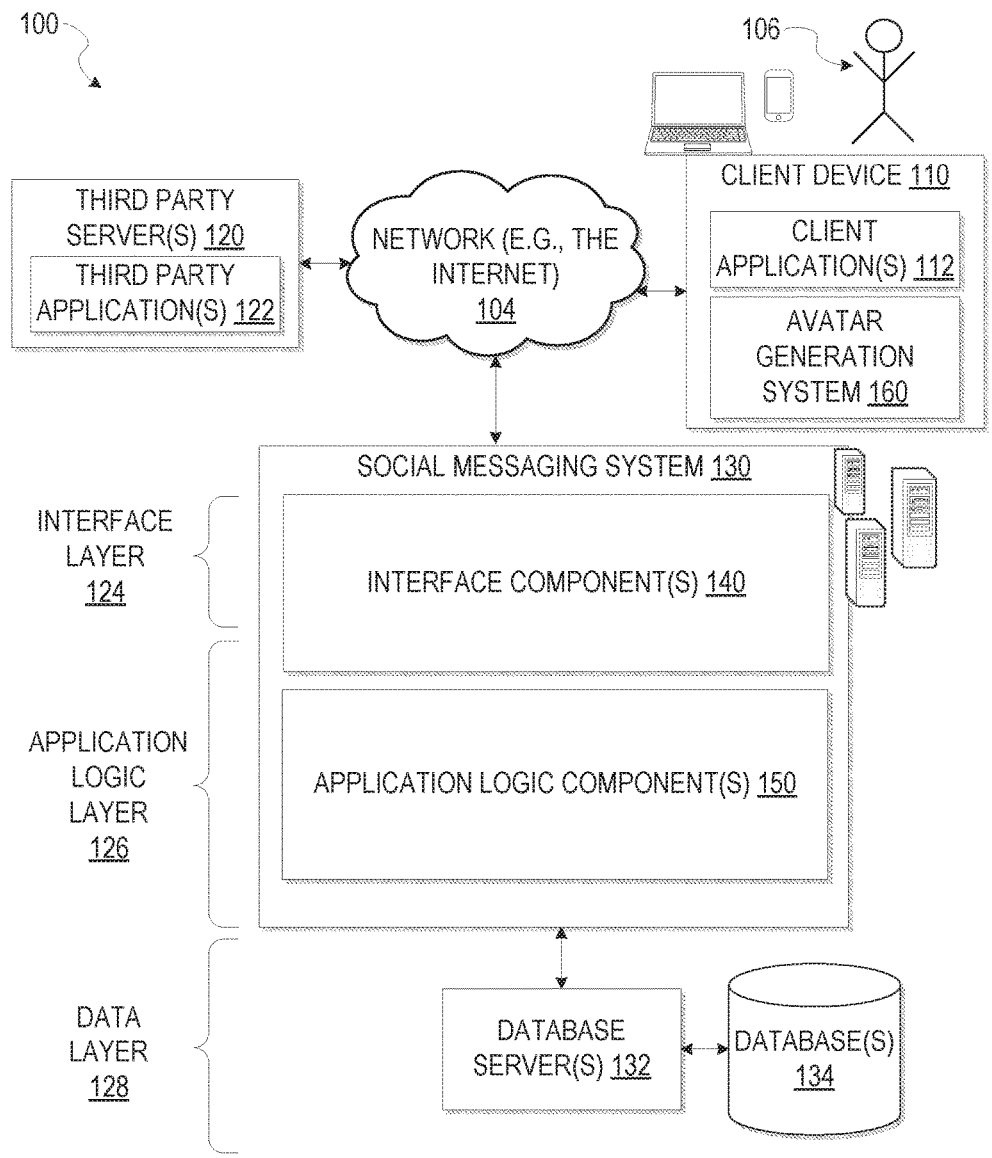
FIG. 1 is a block diagram illustrating a networked system, according to some example embodiments.

The headings provided herein are merely for convenience and do not necessarily affect the scope or meaning of the terms used.

DETAILED DESCRIPTION

The description that follows includes systems, methods, techniques, instruction sequences, and computing machine program products illustrative of embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Although methods exist to generate avatars or representations of faces within an image, most of these methods do not employ facial recognition or facial landmarks as a basis for the generated avatar or representation of the face. Often, where an image is used by a machine to generate an avatar or facial representation, the machine selects solely from a set of templates to approximate the face depicted within the image. Further, machine generated facial representations from images are often computationally intensive and still require user input and selection prior to, during, and after the generation process to produce the facial representation. Accordingly, there is still a need in the art to improve generation of avatars and facial representations without user interaction or with minimal user interaction. Further, there is still a need in the art to improve generation of stylized (e.g., animated and cartoon image) avatars which are reasonable facsimiles of a face depicted within an image using facial landmarks derived from the face and measurements generated based on the facial landmarks. As described herein, methods and systems are presented for generating facial representations or avatars based on facial landmarks of a face depicted within an image using a single user interaction of an initial selection.

Embodiments of the present disclosure may relate generally to automated image segmentation and generation of facial representations based on the segmented image. In one embodiment, a user of a client device may open an application operating on the client device. Selection of a user interface element by the user causes capture of an image using a camera of the client device. The user may then select a "generate avatar" button within the application to cause the application to build an avatar using the captured image. The application may identify facial landmarks, measurements between facial landmarks, and characteristics of the face to generate a look-alike avatar based on the image and proportions of the face. After generating the avatar, the application may present buttons enabling the user to save the avatar, manipulate or customize the avatar, generate another avatar, and generate additional graphics using the avatar. The additional graphics may include digital stickers, emojis, animated bitmap images, and other graphics which may be shared with other users by including the graphics in messages or other communications between client devices.

The above is one specific example. The various embodiments of the present disclosure relate to devices and instructions by one or more processors of a device to modify an image or a video stream transmitted by the device to another device while the video stream is being captured (e.g., modifying a video stream in real time). An avatar generation system is described that identifies and tracks objects and areas of interest within an image or across a video stream and through a set of images comprising the video stream. In various example embodiments, the avatar generation system identifies and tracks one or more facial features depicted in a video stream or within an image and performs image recognition, facial recognition, and facial processing functions with respect to the one or more facial features and interrelations between two or more facial features.

FIG. 1 is a network diagram depicting a network system 100 having a client-server architecture configured for exchanging data over a network, according to one embodiment. For example, the network system 100 may be a messaging system where clients communicate and exchange data within the network system 100. The data may pertain to various functions (e.g., sending and receiving text and media communication, determining geolocation, etc.) and aspects (e.g., transferring communications data, receiving and transmitting indications of communication sessions, etc.) associated with the network system 100 and its users. Although illustrated herein as client-server architecture, other embodiments may include other network architectures, such as peer-to-peer or distributed network environments.

As shown in FIG. 1, the network system 100 includes a social messaging system 130. The social messaging system 130 is generally based on a three-tiered architecture, consisting of an interface layer 124, an application logic layer 126, and a data layer 128. As is understood by skilled artisans in the relevant computer and Internet-related arts, each component or engine shown in FIG. 1 represents a set of executable software instructions and the corresponding hardware (e.g., memory and processor) for executing the instructions, forming a hardware-implemented component or engine and acting, at the time of the execution of instructions, as a special purpose machine configured to carry out a particular set of functions. To avoid obscuring the inventive subject matter with unnecessary detail, various functional components and engines that are not germane to conveying an understanding of the inventive subject matter have been omitted from FIG. 1. Of course, additional functional components and engines may be used with a social messaging system, such as that illustrated in FIG. 1, to facilitate additional functionality that is not specifically described herein. Furthermore, the various functional components and engines depicted in FIG. 1 may reside on a single server computer or client device, or may be distributed across several server computers or client devices in various arrangements. Moreover, although the social messaging system 130 is depicted in FIG. 1 as a three-tiered architecture, the inventive subject matter is by no means limited to such an architecture.

As shown in FIG. 1, the interface layer 124 consists of interface components (e.g., a web server) 140, which receives requests from various client-computing devices and servers, such as client devices 110 executing client application(s) 112, and third party servers 120 executing third party application(s) 122. In response to received requests, the interface component 140 communicates appropriate responses to requesting devices via a network 104. For example, the interface components 140 can receive requests such as Hypertext Transfer Protocol (HTTP) requests, or other web-based, Application Programming Interface (API) requests.

The client devices 110 can execute conventional web browser applications or applications (also referred to as "apps") that have been developed for a specific platform to include any of a wide variety of mobile computing devices and mobile-specific operating systems (e.g., IOS™, ANDROID™, WINDOWS® PHONE). Further, in some example embodiments, the client devices 110 form all or part of an avatar generation system 160 such that components of the avatar generation system 160 configure the client device 110 to perform a specific set of functions with respect to operations of the avatar generation system 160.

In an example, the client devices 110 are executing the client application(s) 112. The client application(s) 112 can provide functionality to present information to a user 106 and communicate via the network 104 to exchange information with the social messaging system 130. Further, in some examples, the client devices 110 execute functionality of the avatar generation system 160 to segment images of video streams during capture of the video streams and transmit the video streams (e.g., with image data modified based on the segmented images of the video stream).

Each of the client devices 110 can comprise a computing device that includes at least a display and communication capabilities with the network 104 to access the social messaging system 130, other client devices, and third party servers 120. The client devices 110 comprise, but are not limited to, remote devices, work stations, computers, general purpose computers, Internet appliances, hand-held devices, wireless devices, portable devices, wearable computers, cellular or mobile phones, personal digital assistants (PDAs), smart phones, tablets, ultrabooks, netbooks, laptops, desktops, multi-processor systems, microprocessor-based or programmable consumer electronics, game consoles, set-top boxes, network PCs, mini-computers, and the like. User 106 can be a person, a machine, or other means of interacting with the client devices 110. In some embodiments, the user 106 interacts with the social messaging system 130 via the client devices 110. The user 106 may not be part of the networked environment, but may be associated with the client devices 110.

As shown in FIG. 1, the data layer 128 as database servers 132 that facilitate access to information storage repositories or databases 134. The databases 134 are storage devices that store data such as member profile data, social graph data (e.g., relationships between members of the social messaging system 130), image modification preference data, accessibility data, and other user data.

An individual can register with the social messaging system 130 to become a member of the social messaging system 130. Once registered, a member can form social network relationships (e.g., friends, followers, or contacts) on the social messaging system 130 and interact with a broad range of applications provided by the social messaging system 130.

The application logic layer 126 includes various application logic components 150, which, in conjunction with the interface components 140, generate various user interfaces with data retrieved from various data sources or data services in the data layer 128. Individual application logic components 150 may be used to implement the functionality associated with various applications, services, and features of the social messaging system 130. For instance, a social messaging application can be implemented with of the application logic components 150. The social messaging application provides a messaging mechanism for users of the client devices 110 to send and receive messages that include text and media content such as pictures and video. The client devices 110 may access and view the messages from the social messaging application for a specified period of time (e.g., limited or unlimited). In an example, a particular message is accessible to a message recipient for a predefined duration (e.g., specified by a message sender) that begins when the particular message is first accessed. After the predefined duration elapses, the message is deleted and is no longer accessible to the message recipient. Of course, other applications and services may be separately embodied in their own application logic components 150.

As illustrated in FIG. 1, the social messaging system 130 may include at least a portion of the avatar generation system 160 capable of identifying, tracking, and modifying video data during capture of the video data by the client device 110. Similarly, the client device 110 includes a portion of the avatar generation system 160, as described above. In other examples, client device 110 may include the entirety of avatar generation system 160. In instances where the client device 110 includes a portion of (or all of) the avatar generation system 160, the client device 110 can work alone or in cooperation with the social messaging system 130 to provide the functionality of the avatar generation system 160 described herein.

In some embodiments, the social messaging system 130 may be an ephemeral message system that enables ephemeral communications where content (e.g. video clips or images) are deleted following a deletion trigger event such as a viewing time or viewing completion. In such embodiments, a device uses the various components described herein within the context of any of generating, sending, receiving, or displaying aspects of an ephemeral message. For example, a device implementing the avatar generation system 160 may identify, track, and modify an object of interest, such as pixels representing skin on a face depicted in the video clip. The device may modify the object of interest during capture of the video clip without image processing after capture of the video clip as a part of a generation of content for an ephemeral message.

Figure 2:
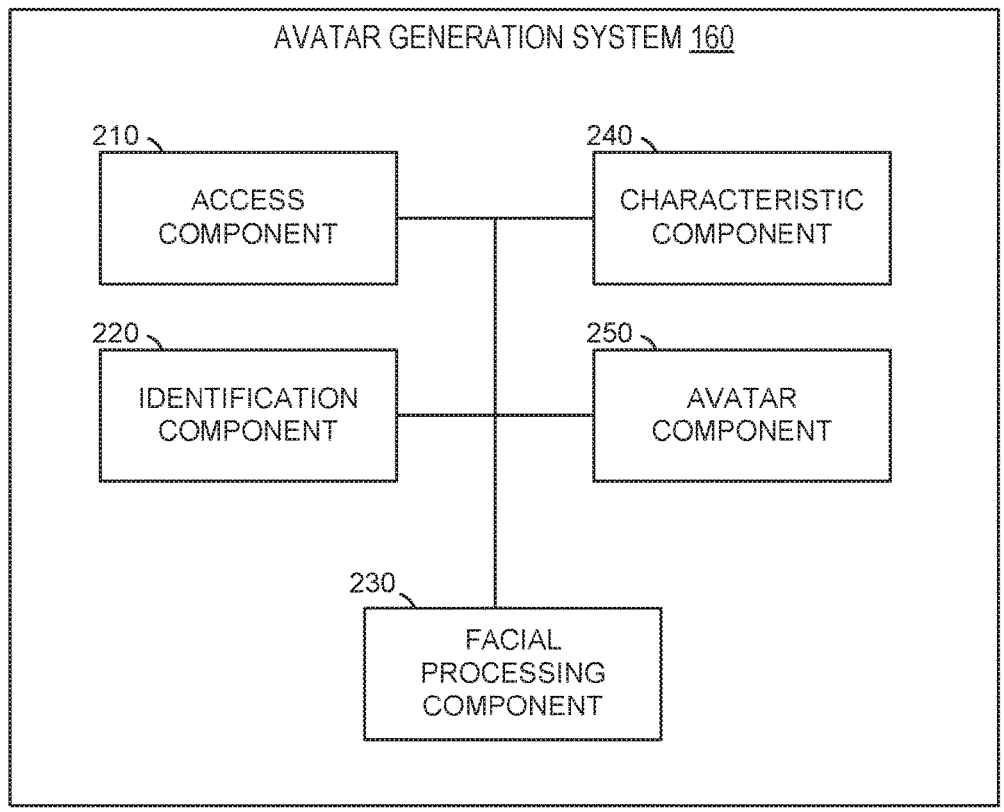
FIG. 2 is a diagram illustrating an avatar generation system, according to some example embodiments.

In FIG. 2, in various embodiments, the avatar generation system 160 can be implemented as a standalone system or implemented in conjunction with the client device 110, and is not necessarily included in the social messaging system 130. The avatar generation system 160 is shown to include an access component 210, an identification component 220, a facial processing component 230, a characteristic component 240, and an avatar component 250. All, or some, of the components 210-250, communicate with each other, for example, via a network coupling, shared memory, and the like. Each component of components 210-250 can be implemented as a single component, combined into other components, or further subdivided into multiple components. Other components not pertinent to example embodiments can also be included, but are not shown.

The access component 210 accesses or otherwise retrieves images captured by an image capture device or otherwise received by or stored in the client device 110. In some instances, the access component 210 may include portions or all of an image capture component configured to cause an image capture device of the client device 110 to capture images based on user interaction with a user interface presented on a display device of the client device 110. The access component 210 may pass images or portions of images to one or more other components of the avatar generation system 160.

The identification component 220 identifies faces or other areas of interest within the image or set of images received from the access component 210. In some embodiments, the identification component 220 tracks the identified face or areas of interest across multiple images of a set of images (e.g., a video stream). The identification component 220 may pass values (e.g., coordinates within the image or portions of the image) representing the face or areas of interest to one or more components of the avatar generation system 160.

The facial processing component 230 identifies facial landmarks depicted on the face or within the areas of interest identified by the identification component 220. In some embodiments, the facial processing component 230 identifies expected but missing facial landmarks in addition to the facial landmarks which are depicted on the face or within the area of interest. The facial processing component 230 may determine an orientation of the face based on the facial landmarks and may identify one or more relationships between the facial landmarks. The facial processing component 230 may pass values representing the facial landmarks to one or more components of the avatar generation system 160.

The characteristic component 240 identifies, determines, or measures one or more characteristics of the face within the image or areas of interest based at least in part on the facial landmarks identified by the facial processing component 230. In some embodiments, the characteristic component 240 identifies facial features based on the facial landmarks. The characteristic component 240 may determine measurements of the identified facial features and distances extending between two or more facial features. In some embodiments, the characteristic component 240 identifies areas of interest and extracts prevailing colors from the areas of interest identified on the face. The characteristic component 240 may pass values representing the one or more characteristics to the avatar component 250.

The avatar component 250 generates an avatar or facial representation based on the one or more characteristics received from the characteristic component 240. In some embodiments, the avatar component 250 generates a stylized representation of the face, such as a cartoon version of the face depicted within the image. The stylized representation may be generated such that the proportions, positions, and prevailing colors of the features identified within the face are matched to the stylized representation. In some embodiments, in order to match the proportions, positions, and prevailing colors, the avatar component 250 independently generates facial feature representations or modifies existing template representations to match the characteristics and facial features identified by the characteristic component 240. The avatar component 250 may cause presentation of the finished avatar of facial representation at a display device of the client device 110. In some embodiments, the avatar component 250 enables generation of graphics using the generated avatar or facial representation such as stickers, emojis, .gifs, and other suitable graphics configured for transmission within a message (e.g., text, short message system messages, instant messages, and temporary messages) to a subsequent client device associated with a subsequent user.

Figure 3:
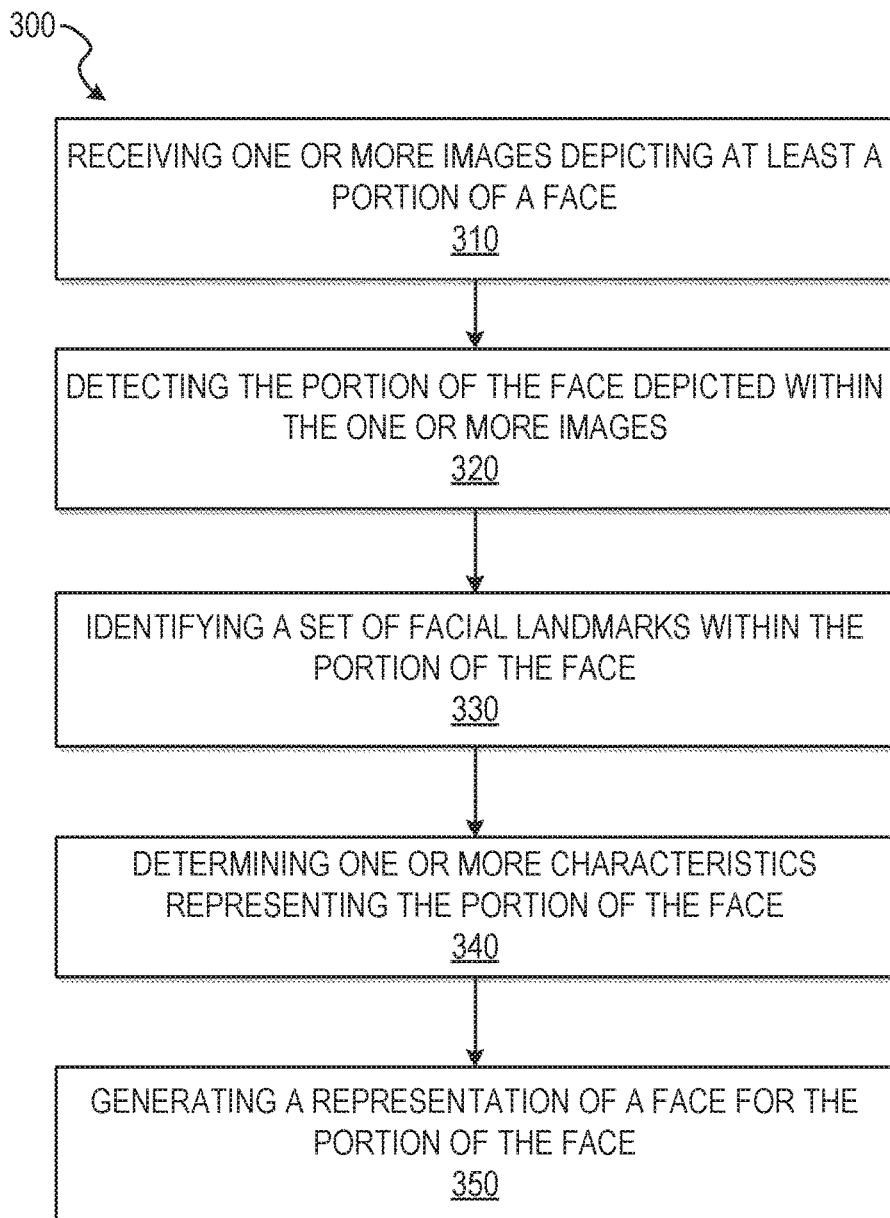
FIG. 3 is a flow diagram illustrating an example method for segmenting an image to generate a representation of a portion of the image, according to some example embodiments.

FIG. 3 depicts a flow diagram illustrating an example method 300 for generating representations of a face from a set of images (e.g., a video stream). The operations of method 300 may be performed by components of the avatar generation system 160, and are so described below for purposes of illustration.

In operation 310, the access component 210 receives or otherwise accesses one or more images depicting at least a portion of a face. In some embodiments, the access component 210 receives the one or more images as a video stream captured by an image captured device associated with the client device 110 and presented on a user interface of an avatar generation application. The access component 210 may include the image capture device as a portion of hardware comprising the access component 210. In these embodiments, the access component 210 directly receives the one or more images or the video stream captured by the image capture device. In some instances, the access component 210 passes all or a part of the one or more images or the video stream (e.g., a set of images comprising the video stream) to one or more components of the avatar generation system 160, as described below in more detail.

In operation 320, the identification component 220 detects the portion of the face depicted within the one or more images. In some embodiments, the identification component 220 includes a set of face tracking operations to identify a face or a portion of a face within the one or more images. The identification component 220 may use the Viola-Jones object detection framework, eigen-face technique, a genetic algorithm for face detection, edge detection methods, or any other suitable object-class detection method or set of operations to identify the face or portion of the face within the one or more images. Where the one or more images are a plurality of images (e.g., a set of images in a video stream) the face tracking operations of the identification component 220, after identifying the face or portion of the face in an initial image, may identify changes in position of the face across multiple images of the plurality of images, thereby tracking movement of the face within the plurality of images. Although specific techniques are described, it should be understood that the identification component 220 may use any suitable technique or set of operations to identify the face or portion of the face within the one or more images without departing from the scope of the present disclosure.

In operation 330, the facial processing component 230 identifies a set of facial landmarks within the portion of the face depicted within the one or more images. In some embodiments, the facial processing component 230 identifies the set of facial landmarks within the portion of the face in a subset of the one or more images. For example, the facial processing component 230 may identify the set of facial landmarks in a set of images (e.g., a first set of images) of a plurality of images, where the portion of the face or the facial landmarks appear in the set of images but not in the remaining images of the plurality of images (e.g., a second set of images). In some embodiments, identification of the facial landmarks may be performed as a sub-operation or part of identification of the face or portion of the face using face tracking operations incorporating the detection operations described above.

In operation 340, the characteristic component 240 determines one or more characteristics representing the portion of the face depicted in the one or more images. In some embodiments, the operation 340 is performed in response to detecting the portion of the face, in the operation 320, and the set of facial landmarks, in the operation 330. Characteristics representing the portion of the face may include presence or absence of one or more features (e.g., an eye, an eyebrow, a nose, a mouth, and a perimeter of a face) depicted on the portion of the face, relative positions of the one or more features (e.g., positions of features relative to one another or relative to an outline of the portion of the face), measuring portions of the one or more features, and measuring distances between the two or more of the features. In some instances, characteristics of the portion of the face include color of the one or more features depicted on the face, relative color between an area of the portion of the face and one or more features depicted on the portion of the face, presence or absence of an obstruction, presence or absence of hair, presence or absence of a shadow, or any other suitable characteristics of the portion of the face.

In operation 350, the avatar component 250 generates a representation of a face for the at least one portion of the face depicted in the one or more images. In some embodiments, the operation 350 is performed based on (e.g., in response to) the one or more characteristics being determined in the operation 340 and the set of facial landmarks being identified in the operation 330. Where the characteristics include one or more measurements for the one or more features depicted on the portion of the face, the avatar component 250 may generate the representation of the face by rendering a base face and head shape according to the characteristics and the one or more measurements. The avatar component 250 may then generate the one or more features depicted on the face and apply the one or more generated features to the base face and head shape. Each of the one or more features may be generated to match one or more measurements associated with the specified feature.

In some embodiments, the avatar component 250 may generate one or more features by matching the one or more features to a feature included in a set of example features. The avatar component 250 may select the feature included in the set. After selection of the feature, the avatar component 250 may apply the selected feature to the base face and head shape. In some instances, the avatar component 250 generates the representation of the face using a combination of generating representations of the one or more features and selecting one or more features from the set of example features.

In some instances, the avatar component 250 may generate one or more graphics using the generated avatar or facial representation. For example, the avatar component 250 may generate the graphics (e.g., sticker or emoji) by inserting a scaled version of the avatar into a template graphic. The avatar component 250 may present graphic templates to the user for selection, such that a user selection causes the avatar component 250 to generate the graphic by inserting the avatar into a predetermined position and dimension of the graphic template. In some instances, the avatar component 250 may generate animated (e.g., moving) graphics for the avatar. The animated graphics may be generated based on generating a plurality of avatars (e.g., avatars presented at different angles or positions) for a set of images forming a video stream. In these embodiments, the animated graphic may be a series of generated avatars presented in succession to form an animation. In some instances, the avatar component 250 may generate the animated graphic from a single generated avatar.

Figure 4:
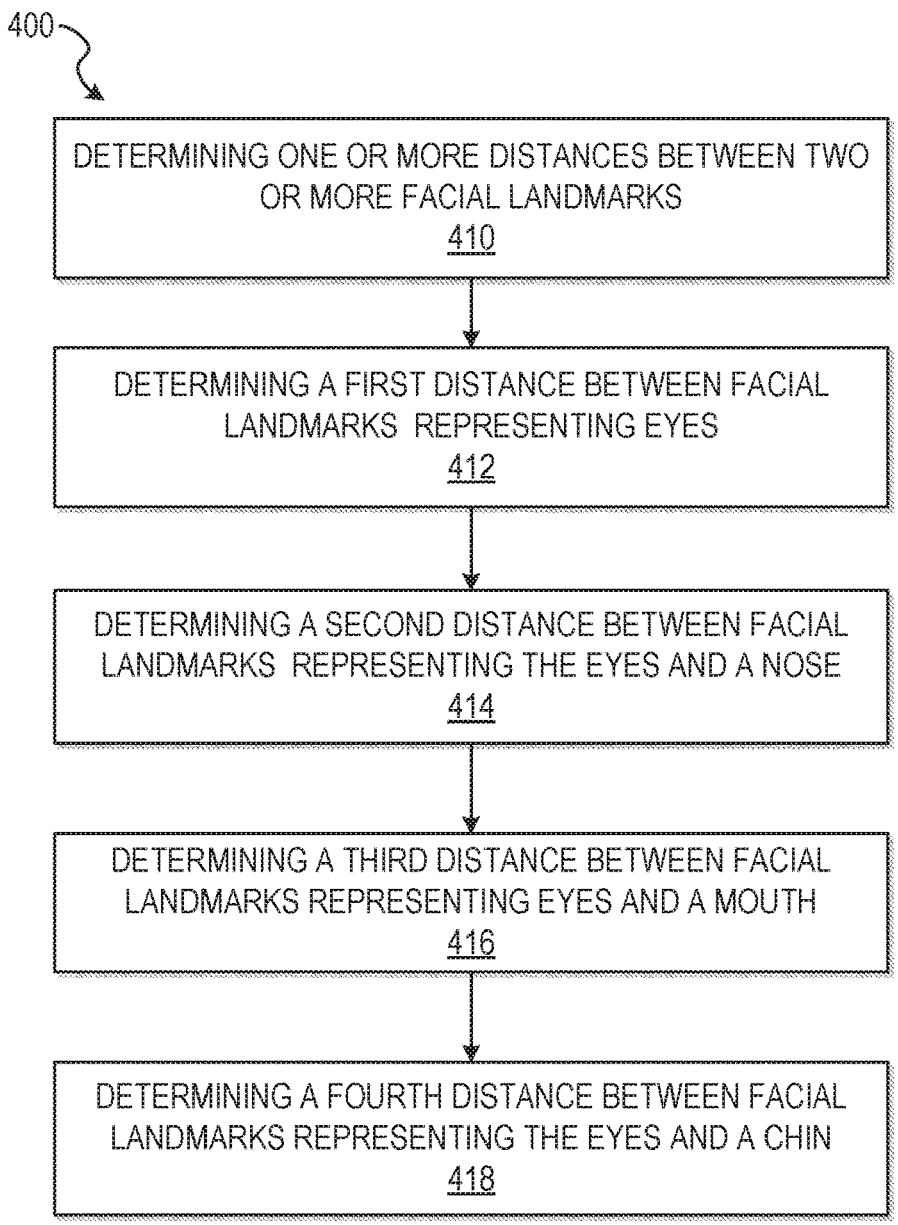
FIG. 4 is a flow diagram illustrating an example method for segmenting an image to generate a representation of a portion of the image, according to some example embodiments.

FIG. 4 shows a flow diagram illustrating an example method 400 for generating representations of a face from a set of images. The operations of method 400 may be performed by components of the avatar generation system 160. In some instances, certain operations of the method 400 may be performed using one or more operations of the method 300 or as sub-operations of one or more operations of the method 300, as will be explained in more detail below.

In operation 410 the facial processing component 230 determines one or more distances between two or more facial landmarks. In some embodiments, the operation 410 is performed as part of or in response to performance of the operation 330. The one or more distances may be measured or determined as pixel distances, actual distances, or relative distances. The facial processing component 230 may identify the two or more facial landmarks between which to determine the distance. In some instances, the facial processing component 230 determines the one or more distances between predetermined facial landmarks, as described below.

In some embodiments, the operation 410 is performed by one or more sub-operations. In operation 412, the facial processing component 230 determines a first distance between facial landmarks of the set of facial landmarks representing eyes depicted on the portion of the face. To measure the first distance, the facial processing component 230 may identify a facial landmark associated with each eye. These facial landmarks may be the inner most landmarks associated with the eye. In some instances, the facial processing component 230 may determine the inner most landmarks associated with the eye by comparing each of the facial landmarks of one eye to the other eye. After identifying the innermost facial landmarks of each eye, the facial processing component 230 determines the first distance between the inner most facial landmarks.

In operation 414, the facial processing component 230 determines a second distance between facial landmarks of the set of facial landmarks representing the eyes and a nose depicted on the portion of the face. In some embodiments, the facial processing component 230 determines the second distance between a selected facial landmark of each eye (e.g., the inner most facial landmark of the eye) and a selected facial landmark associated with the nose. The facial processing component 230 may also determine the second distance as a plurality of distances between one or more facial landmark of each eye and one or more facial landmark of the nose. For example, the facial processing component 230 may identify each eye facial landmark and identify each nose facial landmark and determine a distance between each eye facial landmark and each nose facial landmark to generate the plurality of distances. Although described as a pair of distances and a plurality of distances between each facial landmark, it should be understood that the facial processing component 230 may determine any number of distances between any number of the facial landmarks associated with the nose and facial landmarks associated with the eyes.

In operation 416, the facial processing component 230 determines a third distance between facial landmarks of the set of facial landmarks representing the eyes and a mouth depicted on the portion of the face. The facial processing component 230 may determine a single facial landmark of each eye and determine a distance from those landmarks to distinct facial landmarks of the mouth. For example, the facial processing component 230 may determine the third distance by determining distances between an outer most corner of a first eye and an outer most corner of a mouth on a first side of the face and an outer most corner of a second eye and an outer most corner of a mouth on a second side of the face. Although described with specified facial landmarks, it should be understood that the facial processing component 230 may determine the second distance or a plurality of second distances based on distances determined between any or all of the facial landmarks of the eyes and any or all of the facial landmarks of the mouth.

In operation 418, the facial processing component 230 determines a fourth distance between facial landmarks of the set of facial landmarks representing the eyes and a chin depicted on the portion of the face. In determining the fourth distance, the facial processing component 230 or the characteristic component 240 may determine a position of one or more chin facial landmarks. After determining the position of the one or more chin landmarks, the facial processing component 230 may determine one or more distances between one or more facial landmarks of each eye and one or more chin landmarks.

Figure 5:
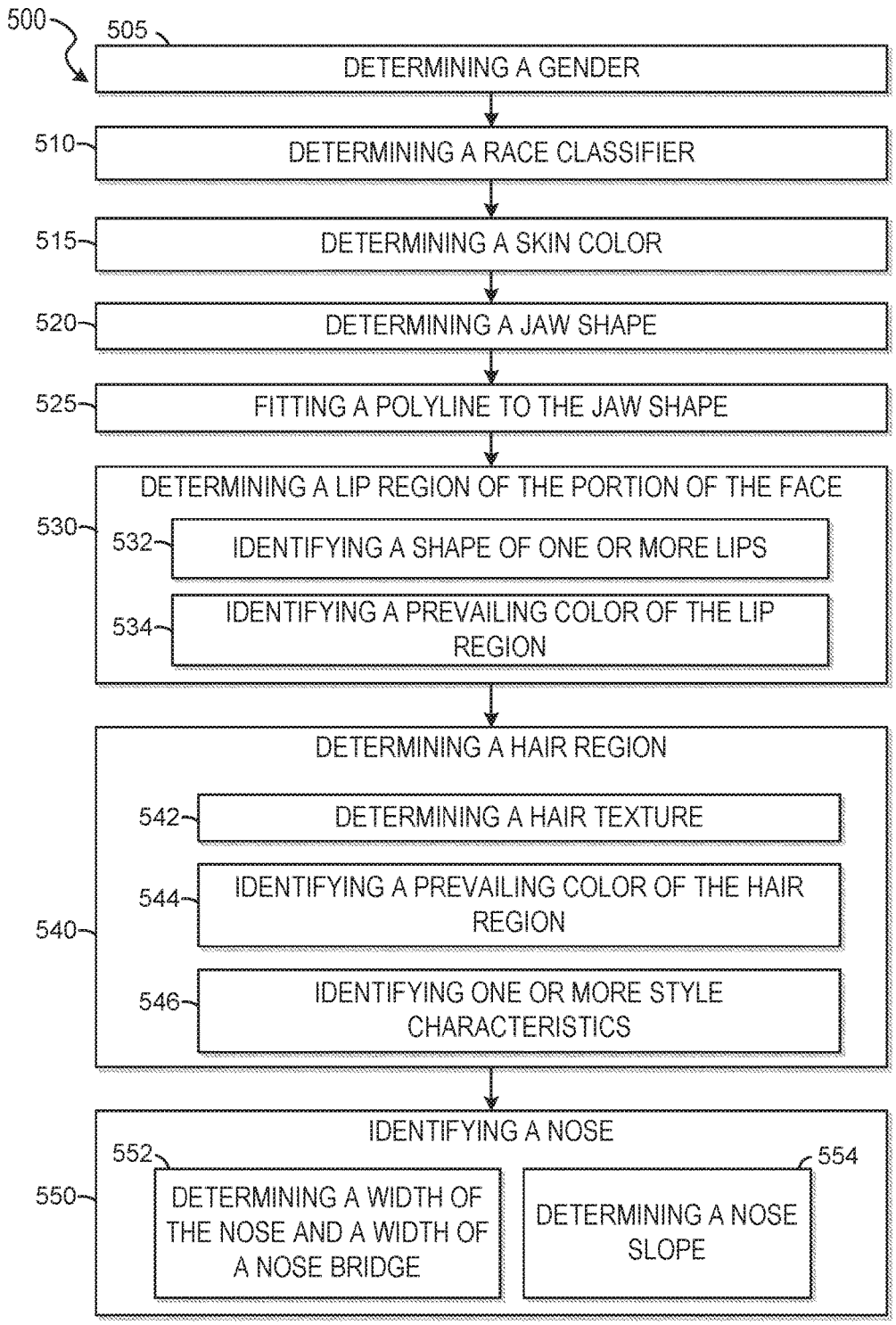
FIG. 5 is a flow diagram illustrating an example method for segmenting an image to generate a representation of a portion of the image, according to some example embodiments.

FIG. 5 depicts a flow diagram illustrating an example method 500 for segmenting portions of a video stream and extracting and modifying colors of the video stream based on the segmentation. The operations of method 500 may be performed by components of the avatar generation system 160. In some instances, certain operations of the method 500 may be performed using one or more operations of the methods 300 or 400, in one or more of the described embodiments, or as sub-operations of one or more operations of the methods 300 or 400, as will be explained in more detail below.

In operation 505, the characteristic component 240 determines a gender of the portion of the face based on the one or more distances between the two or more facial landmarks. In some embodiments, the gender determined by the characteristic component 240 may be a preliminary gender, modified by one or more additional operations or input. In some embodiments, the characteristic component 240 determines the preliminary gender based on common low level visual patterns of the one or more facial landmarks and distances between the two or more facial landmarks. In some instances, the characteristic component 240 determines the preliminary gender based on common low level visual patterns of the face depicted in the image without use of the one or more facial landmarks. The characteristic component 240 may also determine the preliminary gender based on user input within a user interface. For example, a data entry field (e.g., a text box, a dialog box, a set of radio buttons) may be presented within a user interface at a client device. Selection of an option in the data entry field or input of data into the data entry field (e.g., entering text into a text box) may identify a gender and be passed to the characteristic component 240.

In some embodiments, after determining the preliminary gender and generating the representation of the face with respect to the preliminary gender, the avatar generation system 160 presents a gender confirmation at the client device 110. The gender confirmation may include a presentation on a user interface of the client device 110 with one or more user interface elements. In some embodiments, the gender confirmation may include the representation of the face. The one or more user interface elements may include an acceptance element and a rejection element. Selection of the acceptance element indicates acceptance of the preliminary gender, modifying the preliminary gender to a selected gender status. Selection of the rejection element indicates rejection of the preliminary gender. In some instances, after selection of the rejection element, the avatar generation system 160 causes presentation of a set of user interface elements (e.g., gender) for gender selection. Each gender element of the set of user interface elements may represent a gender. Selection of a gender element causes the avatar generation system 160 to modify the representation of the face from the preliminary gender to the selected gender of the gender element.

In operation 510, the characteristic component 240 determines a race identifier of the portion of the face based on the one or more distances between the two or more facial landmarks. In some embodiments, the race identifier may be understood as an ethnicity of an individual or the portion of the face depicted within an image. In these embodiments, the ethnicity may be selected from a set of available ethnicities by the characteristic component based on the portion of the face depicted within the image. The characteristic component 240 may determine the race identifier based on common low level visual patterns of the one or more facial landmarks and distances between two or more facial landmarks.

In some embodiments, after determining the race identifier and generating the representation of the face with respect to the race identifier, the avatar generation system 160 presents a set of user interface elements at the client device 110. The set of user interface elements may also include the representation of the face. The user interface elements may include acceptance and rejection elements. Selection of the rejection element indicates rejection of the race identifier. Upon receiving selection of the rejection element, the avatar generation system 160 may cause presentation of a set of user interface elements for modifying one or more attributes of the avatar including facial feature shapes; hair, skin, and eye color; hair style; and other attributes. Selection of or modification of the one or more attributes may cause the avatar generation system 160 to modify the representation of the face from the determined race identifier to corresponding with the selected modifications.

In some instances, once the characteristic module 240 determines the race identifier, where templates are used to match identified features, the characteristic module 240 determines a subset of available templates for selection for one or more of the identified features. The characteristic module 240 may determine the subsets of templates for identified features based on the determined race identifier.

In operation 515, the characteristic component 240 determines a skin color by identifying an area of interest on the portion of the face and extracting an average color depicted within the area of interest. In some embodiments, the characteristic component 240 identifies an area of interest as a portion of the face depicted within the image located a predetermined distance below one or more of the eyes depicted on the face. The characteristic component 240 extracts the average color from the area of interest. In some embodiments, the characteristic component 240 passes one or more values for the average color to the avatar component 250. The avatar component 250 may then apply the one or more values to the representation of the face. In some instances, the characteristic component 240 may identify a skin template from a set of skin templates. The skin templates of the set of skin templates depicting variations of skin tone for application to the representation of the face. The characteristic component 240 may pass the identified skin template to the avatar component 250 for application to the representation of the face.

In operation 520, the characteristic component 240 determines a jaw shape of the portion of the face based on the set of facial landmarks and the one or more distances between the two or more facial landmarks. In some embodiments, the characteristic component 240 determines the jaw shape as a portion of the one or more facial landmarks of the portion of the face. The characteristic component 240 may identify the jaw portion of the one or more facial landmarks by identifying a set of facial landmarks positioned below one or more facial landmarks associated with a mouth, and extending around the facial landmarks associated with the mouth to a position in a plane extending outwardly from facial landmarks representing nostrils depicted on the portion of the face.

In operation 525, the characteristic component 240 fits a polyline to the jaw shape. The polyline may be a connected sequence of line segments extending from a first end of the jaw shape to a second end of the jaw shape. The first and second ends of the jaw shape may be positioned on the plane extending outwardly from facial landmarks of the nostrils. In some embodiments, the polyline may be fit by determining a number of facial landmarks identified within the jaw shape and connecting each facial landmark in succession from the first end of the jaw shape to the second end of the jaw shape. In some embodiments, the polyline may be a smooth approximate curve which passes through one or more facial landmarks of the jaw shape. The approximate curve may also pass through or travel along edges of the jaw shape such as canny edges. In some embodiments, the characteristic component 240 uses the output of the facial landmark detection instead of a polyline.

In operation 530, the characteristic component 240 determines a lip region of the portion of the face. In some embodiments, the operation 530 comprises one or more sub-operations, determining further characteristics of the lip region. The characteristic component 240 may determine the lip region as one or more facial landmarks positioned between the jaw shape and facial landmarks representing the nose. In some embodiments, the characteristic component 240 may determine the lip region as a set of facial landmarks having a shape corresponding to a predetermined lip shape. In some instances, the characteristic component 240 may determine the lip region using identified facial landmarks of a mouth (e.g., mouth landmarks). The characteristic component 240 may also build lips using one or more binarization and clustering techniques.

In operation 532, the characteristic component 240 identifies a shape of one or more lips within the lip region. The characteristic component 240 may identify the shape of the one or more lips based on comparing the set of facial landmarks of the mouth to a predetermined lip shape. The set of facial landmarks for the mouth may correspond to the predetermined lip shape within a predetermined threshold of error. The set of facial landmarks for the mouth region may identify a mouth width, an upper lip thickness, a lower lip thickness, and a cupid's bow size of the upper lip. The cupid's bow may be understood to be a depression within an upper lip of the mouth caused by a philtrum extending between a lower portion of the nose and the upper lip.

In operation 534, the characteristic component 240 identifies a prevailing color of the lip region. The characteristic component 240 may identify the prevailing lip color by identifying the one or more areas of interest for the upper lip and the lower lip. The characteristic component 240 may identify an average color for the one or more areas of interest and extract the average color, in some embodiments, the characteristic component 240 passes a value for the average color to the avatar component 250 for application of the average color to the lips of the representation of the face.

In operation 540, the characteristic component 240 determines a hair region of the portion of the face. The characteristic component 240 may identify the hair region based on the position of the one or more facial landmarks. In some embodiments, the characteristic component 240 determines a perimeter and orientation of the portion of the face based on the one or more facial landmarks. The characteristic component 240 may then identify the hair region as a region of interest positioned proximate to one or more facial landmarks. In some embodiments, the characteristic component 240 determines the existence of hair within the hair region based on color matching and color differentiation operations, to differentiate one or more color of the hair region from one or more color of the portion of the face and one or more color of a background of the image. In some embodiments, the characteristic component 240 may perform one or more pattern matching operations to identify the hair region. In some embodiments, the characteristic component 240 segments the hair region from the remaining portions of the image to isolate the hair region. In some embodiments, the operation 540 comprises one or more sub-operations, determining further characteristics of the hair region.

In operation 542, the characteristic component 240 determines a hair texture for the hair region. In some embodiments, where hair is identified within the hair region, the characteristic component 240 determines the hair texture based on one or more object or shape recognition operations. The characteristic component 240 may detect the hair texture using edge detection to identify edges of curls within the hair or smooth outlines of hair. In some instances, the characteristic component 240 may identify a set of colors within the hair (e.g., lighter and darker regions and shapes within the hair) to determine the hair texture, using variations in the set of colors to identify edges, objects, or shapes within the hair indicating hair texture.

In operation 544, the characteristic component 240 identifies a prevailing color of the hair region. In some embodiments, the characteristic component 240 identifies one or more colors within the hair region. The characteristic component 240 may determine an average or prevailing color from the one or more colors identified in the hair region. The characteristic component 240 then extracts the average color (e.g., the prevailing color) from the hair region. In some embodiments, the characteristic component 240 passes one or more values for the average color of the hair region to the avatar component 250. The avatar component 250 applies the one or more values to the representation of the hair used in the representation of the face. In some instances, the characteristic component 240 may identify a hair template from a set of hair templates. The hair templates of the set of hair templates depicts variations of hair color for application to the representation of the face. The characteristic component 240 may pass the identified hair template to the avatar component 250 for application to the representation of the face.

In operation 546, the characteristic component 240 identifies one or more style characteristics of the hair region. The characteristic component 240 may identify the one or more style characteristics based on a size and shape of the identified hair region, described above. For example, the characteristic component 240 may identify hair length and hair volume based on dimensions of the hair region in comparison with the one or more facial landmarks. The characteristic component 240 may identify the hair volume based on a distance the hair region extends from a portion of the facial landmarks representing an outline of the face and an outer opposing edge of the hair region. The characteristic component 240 may identify the hair length based on the dimensions determined for hair volume and a distance from the hair region to a subset of facial landmarks representing a chin. For example, the characteristic component 240 may identify long hair where the hair region extends below the subset of facial landmarks representing the chin and short hair where the hair region fails to extend beyond one or more of the facial landmarks of the subset of facial landmarks which represent an upper portion of the chin.

In some instances, the characteristic component 240 may identify the one or more style characteristics based on color variation between the hair region, portions of the face represented by the facial landmarks, and a background of the image. For example, the characteristic component 240 may identify a presence or absence of bangs where a prevailing color of the hair region is detected between the set of facial landmarks representing the outline of the face and a set of facial landmarks representing one or more eyes.

In operation 550, the characteristic component 240 identifies a nose depicted on the portion of the face. In some embodiments, the operation 550 may comprise one or more sub-operations. As shown in FIG. 5, the operation 550 has two sub-operations for determining further characteristics of the nose.

In operation 552, the characteristic component 240 determines a width of the nose and a width of the nose bridge. The characteristic component 240 may identify a set of nasal facial landmarks from among the one or more facial landmarks representing the face. For example the characteristic component 240 may identify facial landmarks representing one or more eye and a mouth within the portion of the face. The characteristic component 240 may identify the set of nasal facial landmarks as the facial landmarks occurring between a portion of the facial landmarks for the eye and the mouth. The characteristic component 240 may also identify the set of nasal facial landmarks based on a numeration of the set of facial landmarks. For example, the characteristic component 240 may identify landmarks numbered fifteen, sixteen, seventeen, and eighteen as nose landmarks, one or more of which correspond to the nasal facial landmarks. To measure the width of the nose, as a distance between two or more facial landmarks representing an outer most portion of an ala on a first side of the nose and an ala on a second (e.g., opposing) side of the nose.

The characteristic component 240 may determine the width of the nose bridge by identifying two or more facial landmarks representing the bridge of the nose. In some embodiments, the characteristic component 240 identifies the two or more facial landmarks for the bridge of the nose as facial landmarks positioned between the inner most facial landmarks of each eye and between facial landmarks of the eyes and facial landmarks of the mouth or the ala of the nose. In some instances, the characteristic component 240 identifies the two or more facial landmarks for the bridge of the nose as landmarks within the above-described region of the face and positioned a distance apart on a plane. The characteristic component 240 may then measure the distance between the two identified facial landmarks. In some embodiments, where greater than two facial landmarks are identified for the bridge of the nose, the characteristic component 240 may determine a set of measurements corresponding to differing portions of the bridge of the nose, in some instances, the set of measurements may be passed to the avatar component 250 for use in generating the representation of the face. The characteristic component 240, having a set of measurements, may determine an average measurement or a representative measurement of the set of measurements to pass to the avatar component 250 for use in generating the representation of the face.

In operation 554, the characteristic component 240 determines a nose slope by determining a visible area of one or more nostrils and one or more edges proximate to the nose. In some embodiments, the characteristic component 240 may identify the one or more edges proximate to the nose using a canny edge detector for edges of the nose extending between facial landmarks identifying the mouth and one or more eye. In some embodiments, one or more of the facial landmarks for the bridge of the nose may be positioned on or proximate to the one or more edges proximate to the nose.

Figure 6:
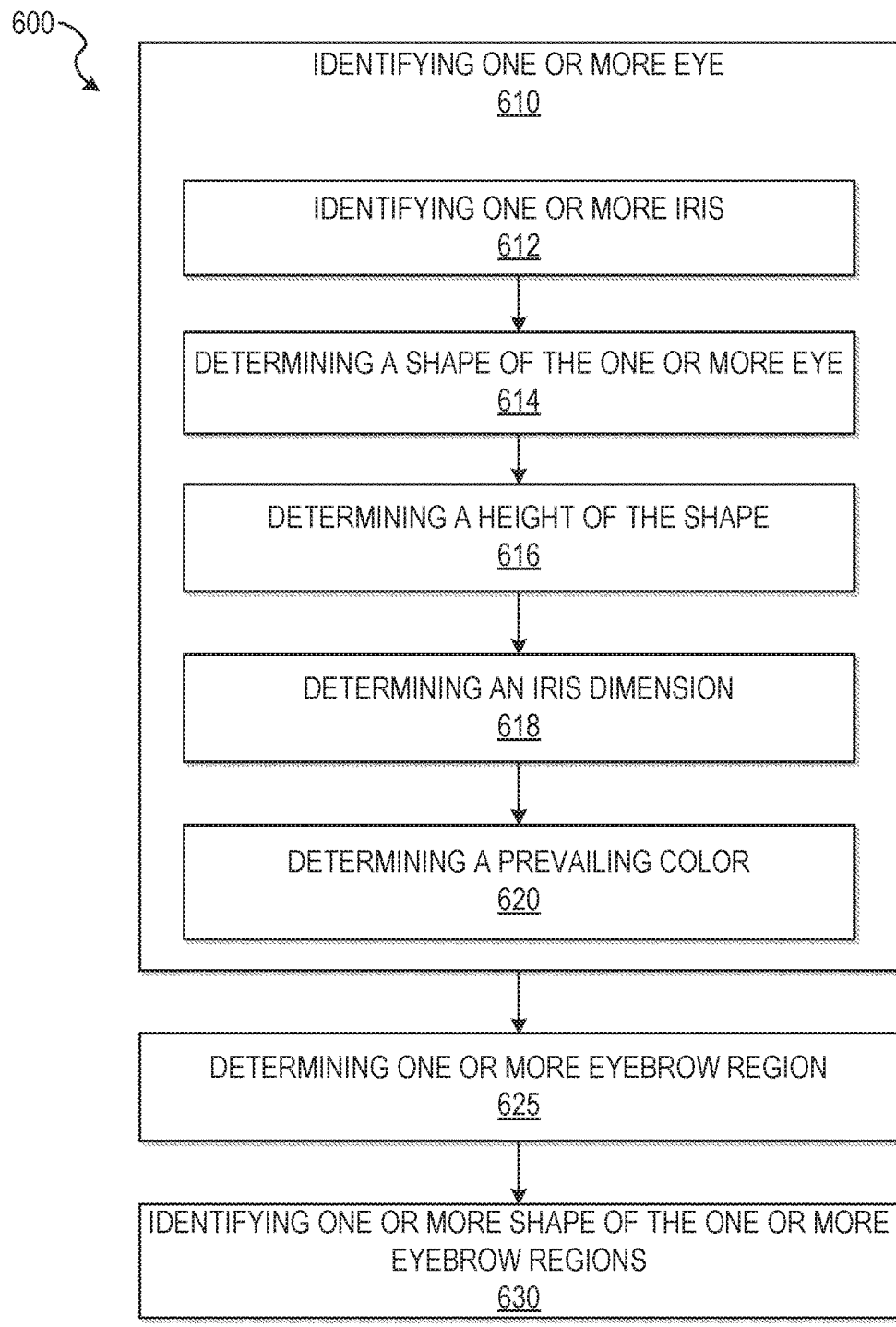
FIG. 6 is a flow diagram illustrating an example method for segmenting an image to generate a representation of a portion of the image, according to some example embodiments.

FIG. 6 shows a flow diagram illustrating an example method 600 for generating representations of a face from a set of images. The operations of method 600 may be performed by components of the avatar generation system 160. In some instances, certain operations of the method 600 may be performed using one or more operations of the method 300, 400, or 500 or as sub-operations of one or more operations of the method 300, 400, or 500, as will be explained in more detail below.

In operation 610, the characteristic component 240 identifies one or more eye within the portion of the face. In some embodiments, the operation 530 may comprise one or more sub-operations for performing image segmentation of predetermined portions of the one or more eyes.

In operation 612, the characteristic component 240 identifies one or more iris within the portion of the face and within the one or more eyes. In some embodiments, the characteristic component 240 identifies the one or iris by identifying a set of eye landmarks of the one or more facial landmarks identified for the portion of the face. The characteristic component 240 may identify the set of eye landmarks based on an aggregate shape, location, or any suitable method. For example, the characteristic component 240 may identify the set of eye landmarks as a set of facial landmarks positioned between landmarks representing the mouth and the eyebrows and spaced a distance apart such that one or more of the nasal facial landmarks are positioned between one or more eye landmarks of the set of eye landmarks. The set of eye landmarks may include facial landmarks representing an outline of the eye and a facial landmark representing an estimated center of a pupil for each eye.

The characteristic component 240 may initially identify the iris circular shape surrounding the facial landmark for the center of a pupil. In some embodiments, the iris is identified based on a color change between the iris and a sclera of each eye positioned within the set of eye landmarks.

In operation 614, the characteristic component 240 determines a shape of the one or more eyes. In some embodiments, the shape of the one or more eyes surrounds the one or more iris. The characteristic component 240 may determine the shape of the eye as a shape formed from the eye landmarks surrounding the facial landmark representing the center of the pupil. In some embodiments, to determine or form the shape of the eye, the characteristic component 240 may generate a polyline extending between the eye landmarks representing the outline of the eye.

In operation 616, the characteristic component 240 determines a height of the shape based on the set of facial landmarks. The characteristic component 240 may determine the height of the shape by identifying a first distance and a second distance for each eye. The first distance may be the largest distance between to eye landmarks forming the outline of the eye. The first distance may be understood as the distance between a first corner and a second corner of the eye. The second distance may be understood as a distance between two of the eye landmarks positioned a distance apart on a plane substantially perpendicular to a plane of the first distance. In some instances, the second distance is determined as the height of the shape. The second distance may be identified as the greatest distance between two opposing eye landmarks which extends substantially perpendicular to the plane of the first distance.

In some instances, the characteristic component 240 determines the shape of the eye using an iterative approach. The characteristic component 240 may determine the points on the eye forming the eye contour inside the eyelids and generates a curve extending along the points. The characteristic component 240 may perform one or more alignment operations to determine an initial inner eye contour. The characteristic component 240 may then use the initial inner eye contour as an input for the one or more alignment operations to generate a subsequent inner eye contour. The characteristic component 240 may perform the one or more alignment operations a predetermined number of times (e.g., four times) to generate a final inner eye contour. In some instances, the characteristic component 240 dynamically determines the inner eye contour by performing the one or more alignment operations, using each successive inner eye contour as an input for a subsequent performance of the one or more alignment operations. The characteristic component 240 may dynamically determine the inner eye contour by performing the one or more alignment operations until a contour difference between a prior inner eye contour and a current inner eye contour is below a predetermined threshold (e.g., ten percent).

In operation 618, the characteristic component 240 may determine an iris dimension for each of the one or more irises based on the height of the shape of the one or more eyes. The characteristic component 240 may determine the iris dimension as a proportion of the eye based on one or more of the height of the shape and the first distance. The proportion may be a predetermined proportion of iris to height of the shape.

In operation 620, the characteristic component 240 determines a prevailing color for the one or more iris. The characteristic component 240 may determine the prevailing eye color as an average of one or more colors detected within pixels of the image positioned within the iris dimension determined in the operation 618. In some embodiments, the characteristic component 240 extracts the prevailing color as one or more color values and passes the one or more color values to the avatar component 250 for application to the representation of the face. In some embodiments, the avatar component 250 identifies an eye color template from a set of eye color templates having a color value closest to the one or more color values supplied by the characteristic component 240 and selects the identified eye color template for use in generating the representation of the face.

In operation 625, the characteristic component 240 determines one or more eyebrow region of the portion of the face. The characteristic component 240 may determine the one or more eyebrow region as one or more facial landmarks positioned between the facial landmarks representing the eyes and the hair region.

In operation 630, the characteristic component 240 identifies one or more shape of the one or more eyebrow region. The characteristic component 240 may determine the one or more shape of the eyebrow region using a self-quotient image algorithm. The one or more shape may be passed to the avatar component 250 for application to the representation of the face. In some embodiments, the avatar component 250 compares the one or more shape to a set of eyebrow templates, where the set of eyebrow templates depict differing shapes of eyebrows. The avatar component 250 may select an eyebrow template from the set of eyebrow templates based on the comparison of the one or more shape to the set of eyebrow templates. For example, the avatar component 250 may identify a bend position (e.g., an arch) within the one or more shape and a distance of a first end and a second end from the bend position, as well as an angle of the bend position extending between a first portion and a second portion of the one or more shape. The avatar component 250 may then select the eyebrow template with a bend position, angle, and overall length (e.g., a length extending between the first end and the second end) which are closest to the one or more shape.

In some embodiments, in identifying and rendering eyebrows, the characteristic component 240 generates a self-quotient image (SQI) binarization matrix. The SQI binarization matrix sets pixels representing the eyebrow as a zero within the matrix and pixels outside of the eyebrow as a one within the matrix. The characterization component 240 fits a first polynomial curve across an upper edge of the pixels represented by zeros and a second polynomial curve across a lower edge of the pixels represented by zeros. The first polynomial curve represents the upper edge of the eyebrow and the second polynomial curve represents the lower edge of the eyebrow. The characteristic component 240 may use the second polynomial curve as a reference line, connecting the ends of the first polynomial line to the ends of the second polynomial line to form the inner edge and outer edges of the eyebrow.

Figure 7:
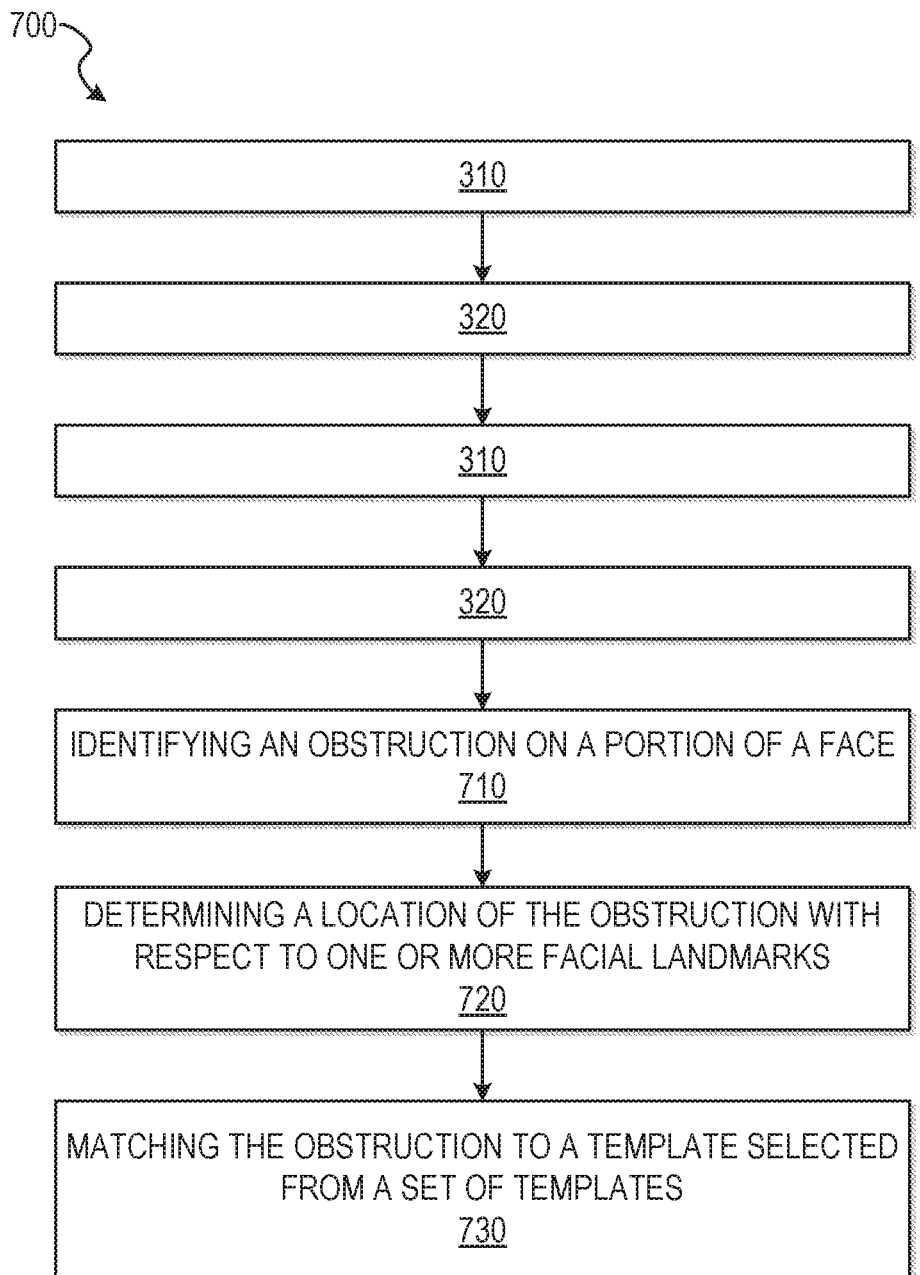
FIG. 7 is a flow diagram illustrating an example method for segmenting an image to generate a representation of a portion of the image, according to some example embodiments.

FIG. 7 shows a flow diagram illustrating an example method 700 for generating representations of a face from a set of images. The operations of method 700 may be performed by components of the avatar generation system 160. In some instances, certain operations of the method 700 may be performed using one or more operations of the method 300, 400, 500, or 600 or as sub-operations of one or more operations of the method 300, 400, 500, or 600, as will be explained in more detail below.

In operation 710, the characteristic component 240 identifies an obstruction on the portion of the face. In some embodiments, the characteristic component 240 identifies the obstruction based on low level representations depicted on the portion of the face. The low level representations may include edges, texture, color, shape, and combinations thereof. For example, the characteristic component 240 may identify the obstruction (e.g., a moustache, goatee, or beard) based on a change in prevailing color exceeding a predetermined threshold (e.g., a distance between a value for the prevailing color and a value for a color of a potential obstruction). In some instances, the characteristic component 240 identifies the obstruction glasses) based on edge detection of an object depicted on the face. The characteristic component 240 may incorporate one or more machine learning techniques to generate a library of detection methods, models, and examples to detect obstructions and differentiate between differing types of obstructions. For example, the characteristic component 240 may incorporate machine learning techniques to distinguish between and detect a beard and a hair texture.

In operation 720, the characteristic component 240 determines a location of the obstruction with respect to one or more of the facial landmarks. In some embodiments, the characteristic component 240 identifies one or more facial landmarks positioned proximate to the obstruction. The characteristic component 240 may also identify one or more facial landmarks which are expected within the area of the obstruction, but are not present.

In operation 730, the characteristic component 240 matches the obstruction to a template selected from a set of templates. In some embodiments, the characteristic component 240 selects a template from a set of templates based on the location of the obstruction determined in the operation 720. For example, the set of templates may include glasses templates, facial hair templates, and clothing templates (e.g., hat templates, helmet templates, scarf templates, or head covering templates). The characteristic component 240 may select a set of hat templates from the clothing templates where the obstruction obscures the hair region or a portion of facial landmarks representing a forehead of the face. The characteristic component 240 may select a set of glasses templates where the obstruction encompasses or is positioned proximate to facial landmarks representing the eyes and the nose. The characteristic component 240 may select a set of facial hair templates where the obstruction is positioned proximate to or obscures facial landmarks representing the mouth or the jaw line.

Although described using operations 710, 720, and 730, the characteristic component 240 may perform these operations in any suitable order to identify, characterize, and match obstructions. In some embodiments, the characteristic component 240 may perform the operation 720 to select a region of the portion of the face where obstructions commonly appear. The characteristic component 240 may then perform operation 710 to use facial landmarks to identify whether an obstruction is present in the selected region. In operation 710, the characteristic component 240 may use one or more machine learning or modeling techniques to identify the obstruction. The characteristic component 240 may then perform operation 730 to match the obstruction to a template.

In some embodiments, where the characteristic component 240 detects an obstruction at a lower portion of a face, the characteristic component 240 may perform one or more operations to identify the obstruction as facial hair and apply a representation of the facial hair to the representation of the face. The characteristic module 240 may generate an SQI binarization matrix or perform SQI binarization to generate a binary image or smoothed image for skin regions and providing a recognizable pattern for facial hair regions. In some instances, the characteristic component 240 performs a texture recognition operation. The texture recognition operation may identify pixels in one or more regions of the obstruction indicating presence of facial hair. The characteristic component 240 may use color, shape, or other suitable indicators for the texture recognition operation to detect facial hair within the region of the obstruction. The characteristic component 240 may then identify neighboring pixels within the obstruction region that share the texture indicators representing facial hair.

The characteristic component 240 may divide the obstruction region into a set of obstruction sub-regions to identify facial hair obstruction on various portions of the face. The characteristic component 240 may perform the texture recognition operation on a mustache region (e.g., a region between the nose and the upper lip and extending downward on the face proximate to corners of the mouth), a chin region, and a sideburn region (e.g., two regions, each extending downwardly from a position proximate to an ear and toward the jaw line and extending from the ear toward the mouth.). For each obstruction sub-region, the characteristic component 240 may select a template for the facial hair obstruction having a shape and color proximate to the shape and color of the facial hair obstruction detected in the sub-region.

Once the characteristic component 240 selects a template set (e.g., a set of hat templates, a set of glasses templates, or a set of facial hair templates), the characteristic component 240 may identify a template from the template set to act as an approximation for the obstruction. In some embodiments, the characteristic component 240 performs edge recognition on the object and the template set to identify the template of the template set having one or more dimensions or characteristics which most closely match the obstruction. Upon selecting the template, the characteristic component 240 passes the selected template to the avatar component 250 for application to the representation of the face. Although described as a single obstruction and a single template, the characteristic component 240 may identify a plurality of obstructions and select templates suitable to each obstruction of the plurality of obstructions. For example, the characteristic component 240 may identify two obstructions representing a glasses and a beard. The characteristic component 240 may select a glasses template matching the glasses obstruction and a beard template matching the beard obstruction.

In some embodiments, the characteristic component 240 uses a steerable filter for detecting wrinkles and application of the wrinkles to the representation of the face. The characteristic component 240 may detect lines on a surface of the face (e.g., a forehead and around a mouth) using the steerable filter. Once detected, the characteristic component 240 may select a wrinkle template for application to the representation of the face. In some instances, for each wrinkle, the characteristic component 240 determines if the line for the wrinkle exceeds a predetermined length and fit a line to the wrinkle. The characteristic component 240 may determine a relative location of each wrinkle to one or more facial landmarks. The characteristic component 240 may then transfer the shape and relative position of the wrinkle to the representation of the face.

Modules, Components, and Logic

Certain embodiments are described herein as including logic or a number of components, modules, or mechanisms. Components can constitute hardware components. A "hardware component" is a tangible unit capable of performing certain operations and can be configured or arranged in a certain physical manner. In various example embodiments, computer systems (e.g., a standalone computer system, a client computer system, or a server computer system) or hardware components of a computer system (e.g., at least one hardware processor, a processor, or a group of processors) is configured by software (e.g., an application or application portion) as a hardware component that operates to perform certain operations as described herein.

In some embodiments, a hardware component is implemented mechanically, electronically, or any suitable combination thereof. For example, a hardware component can include dedicated circuitry or logic that is permanently configured to perform certain operations. For example, a hardware component can be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component can include software encompassed within a general-purpose processor or other programmable processor. It will be appreciated that the decision to implement a hardware component mechanically, in dedicated and permanently configured circuitry, or in temporarily configured circuitry (e.g., configured by software) can be driven by cost and time considerations.

Accordingly, the phrase "hardware component" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented component" refers to a hardware component. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software can accordingly configure a particular processor or processors, for example, to constitute a particular hardware component at one instance of time and to constitute a different hardware component at a different instance of time.

Hardware components can provide information to, and receive information from, other hardware components. Accordingly, the described hardware components can be regarded as being communicatively coupled. Where multiple hardware components exist contemporaneously, communications can be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component performs an operation and stores the output of that operation in a memory device to which it is communicatively coupled. A further hardware component can then, at a later time, access the memory device to retrieve and process the stored output. Hardware components can also initiate communications with input or output devices, and can operate on a resource (e.g., a collection of information).

The various operations of example methods described herein can be performed, at least partially, by processors that are temporarily configured (e.g., by software) or permanently configured to perform the relevant operations. Whether temporarily or permanently configured, such processors constitute processor-implemented components that operate to perform operations or functions described herein. As used herein, "processor-implemented component" refers to a hardware component implemented using processors.

Similarly, the methods described herein can be at least partially processor-implemented, with a particular processor or processors being an example of hardware. For example, at least some of the operations of a method can be performed by processors or processor-implemented components. Moreover, the processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via appropriate interfaces (e.g., an Application Program Interface (API)).

The performance of certain of the operations may be distributed among the processors, not only residing within a single machine, but deployed across a number of machines. In some example embodiments, the processors or processor-implemented components are located in a single geographic location (e.g., within a home environment, an office environment, or a server farm). In other example embodiments, the processors or processor-implemented components are distributed across a number of geographic locations.

Applications

Figure 8:
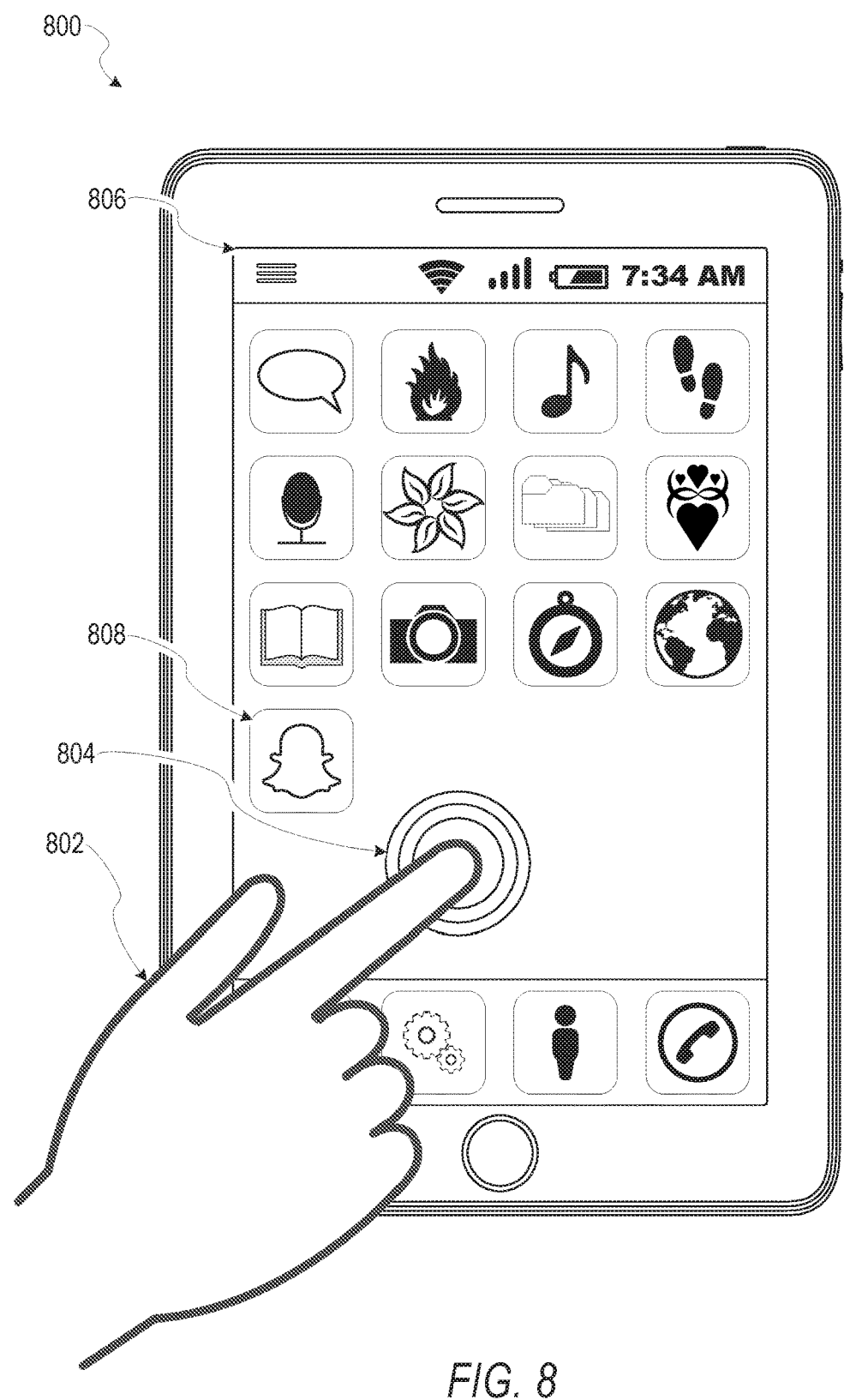
FIG. 8 is a user interface diagram depicting an example mobile device and mobile operating system interface, according to some example embodiments.

FIG. 8 illustrates an example mobile device 800 executing a mobile operating system (e.g., IOS™ ANDROID™, WINDOWS® Phone, or other mobile operating systems), consistent with some embodiments. In one embodiment, the mobile device 800 includes a touch screen operable to receive tactile data from a user 802. For instance, the user 802 may physically touch 804 the mobile device 800, and in response to the touch 804, the mobile device 800 may determine tactile data such as touch location, touch force, or gesture motion. In various example embodiments, the mobile device 800 displays a home screen 806 (e.g., Springboard on IOS™) operable to launch applications or otherwise manage various aspects of the mobile device 800. In some example embodiments, the home screen 806 provides status information such as battery life, connectivity, or other hardware statuses. The user 802 can activate user interface elements by touching an area occupied by a respective user interface element. In this manner, the user 802 interacts with the applications of the mobile device 800. For example, touching the area occupied by a particular icon included in the home screen 806 causes launching of an application corresponding to the particular icon.

The mobile device 800, as shown in FIG. 8, includes an imaging device 808. The imaging device may be a camera or any other device coupled to the mobile device 800 capable of capturing a video stream or one or more successive images. The imaging device 808 may be triggered by the avatar generation system 160 or a selectable user interface element to initiate capture of a video stream or succession of images and pass the video stream or succession of images to the avatar generation system 160 for processing according to the one or more methods described in the present disclosure.

Many varieties of applications (also referred to as "apps") can be executing on the mobile device 800, such as native applications (e.g., applications programmed in Objective-C, Swift, or another suitable language running on IOS™, or applications programmed in Java running on ANDROID™), mobile web applications (e.g., applications written in Hypertext Markup Language-5 (HTML5)), or hybrid applications (e.g., a native shell application that launches an HTML5 session). For example, the mobile device 800 includes a messaging app, an audio recording app, a camera app, a book reader app, a media app, a fitness app, a file management app, a location app, a browser app, a settings app, a contacts app, a telephone call app, or other apps (e.g., gaming apps, social networking apps, biometric monitoring apps). In another example, the mobile device 800 includes a social messaging app 810 such as SNAPCHAT® that, consistent with some embodiments, allows users to exchange ephemeral messages that include media content. In this example, the social messaging app 810 can incorporate aspects of embodiments described herein. For example, in some embodiments the social messaging application includes an ephemeral gallery of media created by users the social messaging application. These galleries may consist of videos or pictures posted by a user and made viewable by contacts (e.g., "friends") of the user. Alternatively, public galleries may be created by administrators of the social messaging application consisting of media from any users of the application (and accessible by all users). In yet another embodiment, the social messaging application may include a "magazine" feature which consists of articles and other content generated by publishers on the social messaging application's platform and accessible by any users. Any of these environments or platforms may be used to implement concepts of the present invention.

In some embodiments, an ephemeral message system may include messages having ephemeral video clips or images which are deleted following a deletion trigger event such as a viewing time or viewing completion. In such embodiments, a device implementing the avatar generation system 160 may identify, track, extract, and generate representations of a face within the ephemeral video clip, as the ephemeral video clip is being captured by the device and transmit the ephemeral video clip to another device using the ephemeral message system.

Software Architecture

Figure 9:
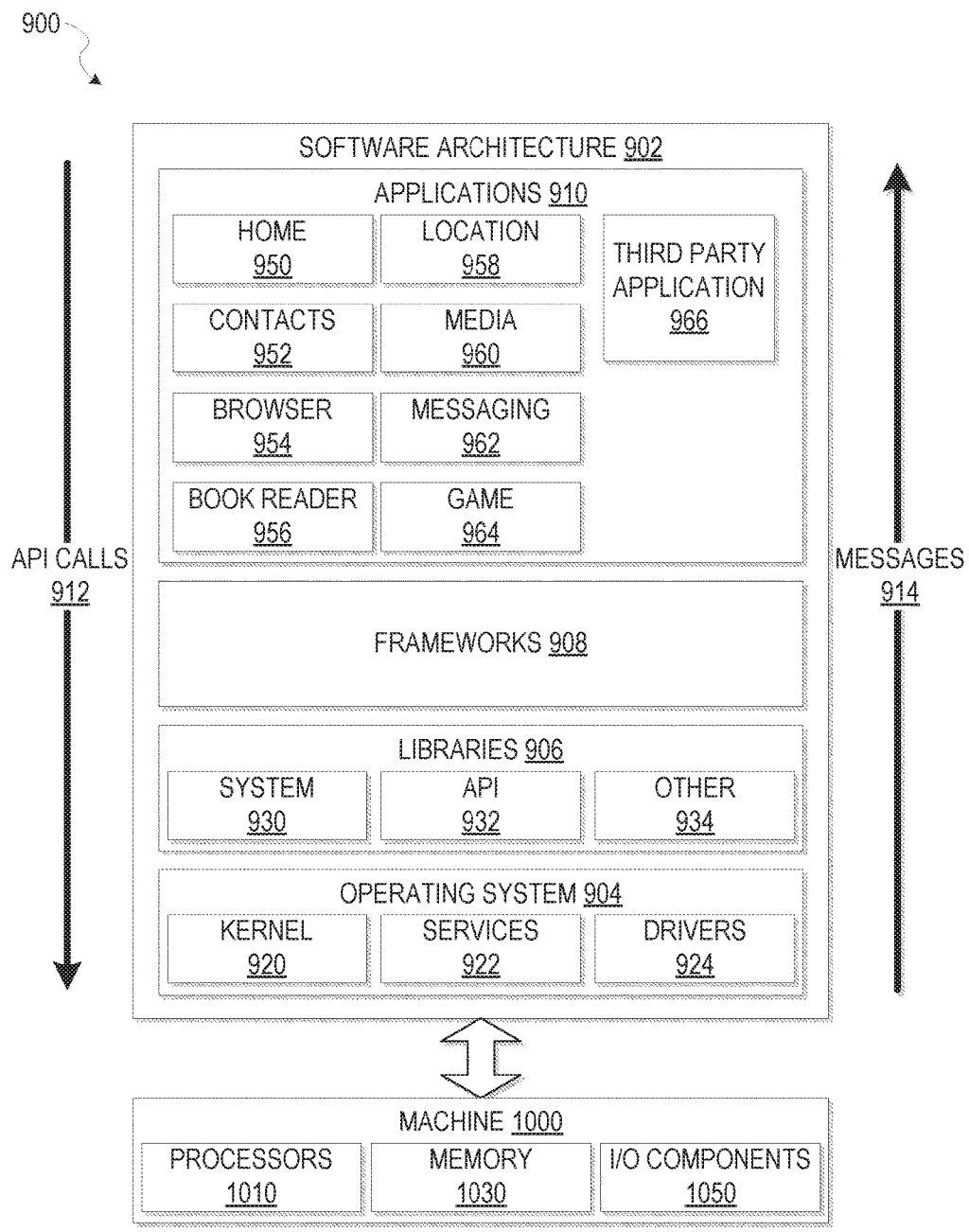
FIG. 9 is a block diagram illustrating an example of a software architecture that may be installed on a machine, according to some example embodiments.

FIG. 9 is a block diagram 900 illustrating an architecture of software 902, which can be installed on the devices described above. FIG. 9 is merely a non-limiting example of a software architecture, and it will be appreciated that many other architectures can be implemented to facilitate the functionality described herein. In various embodiments, the software 902 is implemented by hardware such as machine a 1000 of FIG. 10 that includes processors 1010, memory 1030, and I/O components 1050. In this example architecture, the software 902 can be conceptualized as a stack of layers where each layer may provide a particular functionality. For example, the software 902 includes layers such as an operating system 904, libraries 906, frameworks 908, and applications 910. Operationally, the applications 910 invoke application programming interface (API) calls 912 through the software stack and receive messages 914 in response to the API calls 912, consistent with some embodiments.

In various implementations, the operating system 904 manages hardware resources and provides common services. The operating system 904 includes, for example, a kernel 920, services 922, and drivers 924. The kernel 920 acts as an abstraction layer between the hardware and the other software layers consistent with some embodiments. For example, the kernel 920 provides memory management, processor management (e.g., scheduling), component management, networking, and security settings, among other functionality. The services 922 can provide other common services for the other software layers. The drivers 924 are responsible for controlling or interfacing with the underlying hardware, according to some embodiments. For instance, the drivers 924 can include display drivers, camera drivers, BLUETOOTH® drivers, flash memory drivers, serial communication drivers (e.g., Universal Serial Bus (USB) drivers), WI-FI® drivers, audio drivers, power management drivers, and so forth.

In some embodiments, the libraries 906 provide a low-level common infrastructure utilized by the applications 910. The libraries 906 can include system libraries 930 (e.g., C standard library) that can provide functions such as memory allocation functions, string manipulation functions, mathematic functions, and the like. In addition, the libraries 906 can include API libraries 932 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 906 can also include a wide variety of other libraries 934 to provide many other APIs to the applications 910.

The frameworks 908 provide a high-level common infrastructure that can be utilized by the applications 910, according to some embodiments. For example, the frameworks 908 provide various graphic user interface (GUI) functions, high-level resource management, high-level location services, and so forth. The frameworks 908 can provide a broad spectrum of other APIs that can be utilized by the applications 910, some of which may be specific to a particular operating system or platform.

In an example embodiment, the applications 910 include a home application 950, a contacts application 952, a browser application 954, a book reader application 956, a location application 958, a media application 960, a messaging application 962, a game application 964, and a broad assortment of other applications such as a third party application 966. According to some embodiments, the applications 910 are programs that execute functions defined in the programs. Various programming languages can be employed to create the applications 910, structured in a variety of manners, such as object-oriented programming languages (e.g., Objective-C, Java, or C++) or procedural programming languages (e.g., C or assembly language). In a specific example, the third party application 966 (e.g., an application developed using the ANDROID™ or IOS™ software development kit (SDK) by an entity other than the vendor of the particular platform) may be mobile software running on a mobile operating system such as IOS™, ANDROID™, WINDOWS® PHONE, or another mobile operating systems. In this example, the third party application 966 can invoke the API calls 912 provided by the operating system 904 to facilitate functionality described herein.

Example Machine Architecture and Machine-Readable Medium

Figure 10:
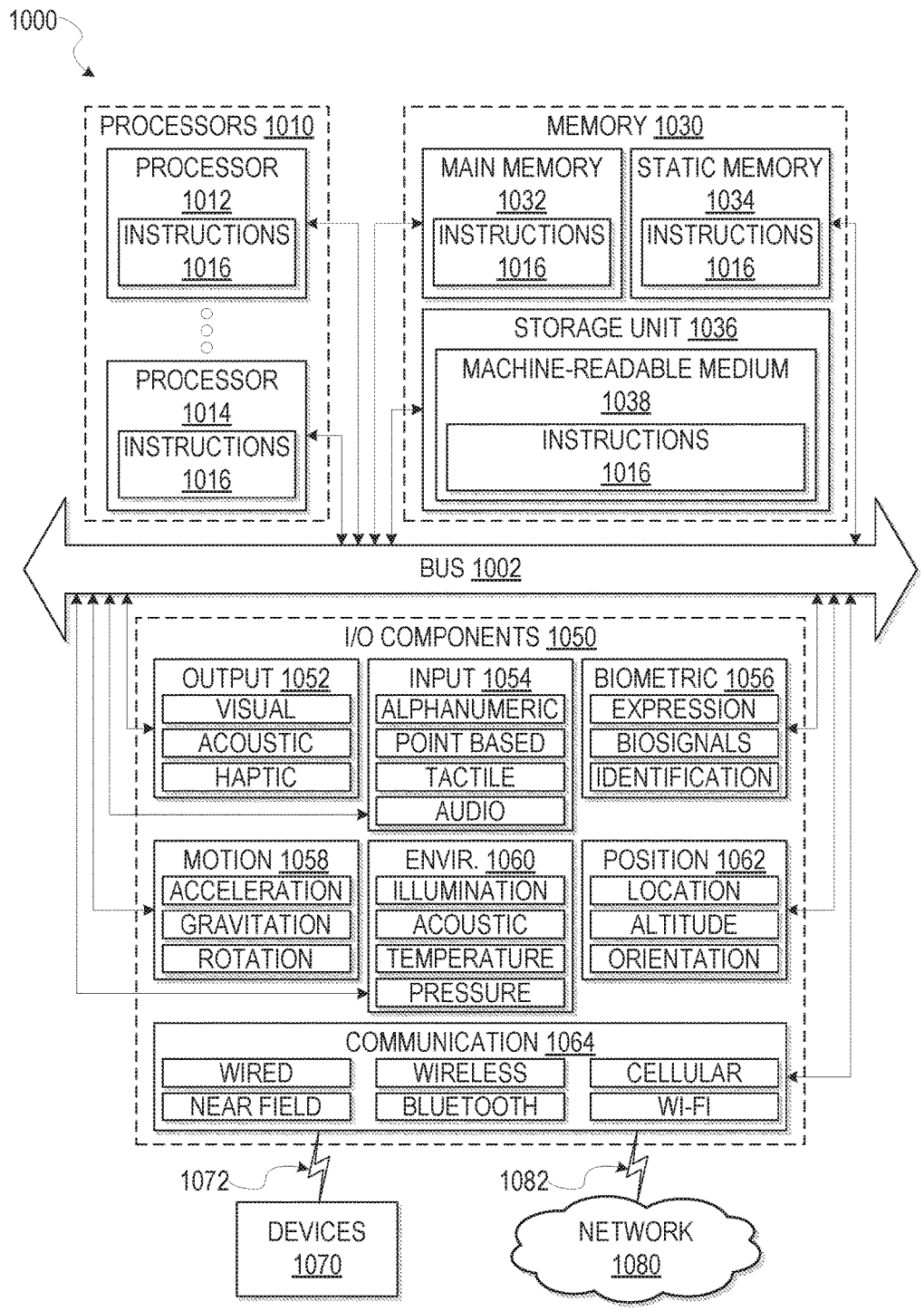
FIG. 10 is a block diagram presenting a diagrammatic representation of a machine in the form of a computer system within which a set of instructions may be executed for causing the machine to perform any of the methodologies discussed herein, according to an example embodiment.

FIG. 10 is a block diagram illustrating components of a machine 1000, according to some embodiments, able to read instructions (e.g., processor executable instructions) from a machine-readable medium (e.g., a non-transitory machine-readable storage medium) and perform any of the methodologies discussed herein. Specifically, FIG. 10 shows a diagrammatic representation of the machine 1000 in the example form of a computer system, within which instructions 1016 (e.g., software, a program, an application, an apples, an app, or other executable code) for causing the machine 1000 to perform any of the methodologies discussed herein can be executed. In alternative embodiments, the machine 1000 operates as a standalone device or can be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1016, sequentially or otherwise, that specify actions to be taken by the machine 1000. Further, while only a single machine 1000 is illustrated, the term "machine" shall also be taken to include a collection of machines 1000 that individually or jointly execute the instructions 1016 to perform any of the methodologies discussed herein.

In various embodiments, the machine 1000 comprises processors 1010, memory 1030, and I/O components 1050, which can be configured to communicate with each other via a bus 1002. In an example embodiment, the processors 1010 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) includes, for example, a processor 1012 and a processor 1014 that may execute the instructions 1016. The term "processor" is intended to include multi-core processors that may comprise two or more independent processors (also referred to as "cores") that can execute instructions contemporaneously. Although FIG. 10 shows multiple processors, the machine 1000 may include a single processor with a single core, a single processor with multiple cores (e.g., a multi-core processor), multiple processors with a single core, multiple processors with multiples cores, or any combination thereof.

The memory 1030 comprises a main memory 1032, a static memory 1034, and a storage unit 1036 accessible to the processors 1010 via the bus 1002, according to some embodiments. The storage unit 1036 can include a machine-readable medium 1038 on which are stored the instructions 1016 embodying any of the methodologies or functions described herein. The instructions 1016 can also reside, completely or at least partially, within the main memory 1032, within the static memory 1034, within at least one of the processors 1010 (e.g., within the processor's cache memory), or any suitable combination thereof, during execution thereof by the machine 1000. Accordingly, in various embodiments, the main memory 1032, the static memory 1034, and the processors 1010 are considered machine-readable media 1038.

As used herein, the term "memory" refers to a machine-readable medium 1038 able to store data temporarily or permanently and may be taken to include, but not be limited to, random-access memory (RAM), read-only memory (ROM), buffer memory, flash memory, and cache memory. While the machine-readable medium 1038 is shown in an example embodiment to be a single medium, the term "machine-readable medium" should be taken to include a single medium or multiple media (e.g., a centralized or distributed database, or associated caches and servers) able to store the instructions 1016. The term "machine-readable medium" shall also be taken to include any medium, or combination of multiple media, that is capable of storing instructions (e.g., instructions 1016) for execution by a machine (e.g., machine 1000), such that the instructions, when executed by processors of the machine 1000 (e.g., processors 1010), cause the machine 1000 to perform any of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 1050 include a wide variety of components to receive input, provide output, produce output, transmit information, exchange information, capture measurements, and so on. In general, it will be appreciated that the I/O components 1050 can include many other components that are not shown in FIG. 10. The I/O components 1050 are grouped according to functionality merely for simplifying the following discussion, and the grouping is in no way limiting. In various example embodiments, the I/O components 1050 include output components 1052 and input components 1054. The output components 1052 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1054 include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1050 include biometric components 1056, motion components 1058, environmental components 1060, or position components 1062, among a wide array of other components. For example, the biometric components 1056 include components to detect expressions (e.g., hand expressions, facial expressions, vocal expressions, body gestures, or mouth gestures), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1058 include acceleration sensor components (e.g., accelerometer), gravitation sensor components, rotation sensor components (e.g., gyroscope), and so forth. The environmental components 1060 include, for example, illumination sensor components (e.g., photometer), temperature sensor components (e.g., thermometers that detect ambient temperature), humidity sensor components, pressure sensor components (e.g., barometer), acoustic sensor components (e.g., microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1062 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1050 may include communication components 1064 operable to couple the machine 1000 to a network 1080 or devices 1070 via a coupling 1082 and a coupling 1072, respectively. For example, the communication components 1064 include a network interface component or another suitable device to interface with the network 1080. In further examples, communication components 1064 include wired communication components, wireless communication components, cellular communication components, Near Field Communication (NFC) components, BLUETOOTH® components (e.g., BLUETOOTH® Low Energy), WI-FI® components, and other communication components to provide communication via other modalities. The devices 1070 may be another machine or any of a wide variety of peripheral devices (e.g., a peripheral device coupled via a Universal Serial Bus (USB)).

Moreover, in some embodiments, the communication components 1064 detect identifiers or include components operable to detect identifiers. For example, the communication components 1064 include Radio Frequency Identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes acoustic detection components (e.g., microphones to identify tagged audio signals), or any suitable combination thereof. In addition, a variety of information can be derived via the communication components 1064, such as location via Internet Protocol (IP) geolocation, location via WI-FI® signal triangulation, location via detecting a BLUETOOTH® or NEC beacon signal that may indicate a particular location, and so forth.

Transmission Medium

In various example embodiments, portions of the network 1080 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a WI-FI® network, another type of network, or a combination of two or more such networks. For example, the network 1080 or a portion of the network 1080 may include a wireless or cellular network, and the coupling 1082 may be a Code Division Multiple Access (CDMA) connection, a Global System for Mobile communications (GSM) connection, or another type of cellular or wireless coupling. In this example, the coupling 1082 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 1016 are transmitted or received over the network 1080 using a transmission medium via a network interface device (e.g., a network interface component included in the communication components 1064) and utilizing any one of a number of well-known transfer protocols (e.g., Hypertext Transfer Protocol (HTTP)). Similarly, in other example embodiments, the instructions 1016 are transmitted or received using a transmission medium via the coupling 1072 (e.g., a peer-to-peer coupling) to the devices 1070. The term "transmission medium" shall be taken to include any intangible medium that is capable of storing, encoding, or carrying the instructions 1016 for execution by the machine 1000, and includes digital or analog communications signals or other intangible media to facilitate communication of such software.

Furthermore, the machine-readable medium 1038 is non-transitory (in other words, not having any transitory signals) in that it does not embody a propagating signal. However, labeling the machine-readable medium 1038 "non-transitory" should not be construed to mean that the medium is incapable of movement; the medium should be considered as being transportable from one physical location to another. Additionally, since the machine-readable medium 1038 is tangible, the medium may be considered to be a machine-readable device.

Language

Throughout this specification, plural instances may implement components, operations, or structures described as a single instance. Although individual operations of methods are illustrated and described as separate operations, individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, components, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method, comprising:
receiving, by one or more processors, one or more two-dimensional images depicting at least a portion of a face of a first user;
detecting, by the one or more processors, the portion of the face depicted within the one or more two-dimensional images;
identifying a set of facial landmarks within the portion of the face depicted within the one or more two-dimensional images;
in response to detecting the portion of the face and the set of facial landmarks, determining one or more characteristics representing the portion of the face depicted in the one or more two-dimensional images, the determining comprising:
identifying a set of colors within a hair region of the face;
determining a hair texture for the hair region based on variations in the set of colors that indicate edges, objects or shapes within the hair associated with the hair texture;
comparing a dimension of the hair region to one or more of the set of facial landmarks; and
determining hair length or hair volume based on the comparison of the dimension of the hair region to the one or more of the set of facial landmarks;
based on the one or more characteristics and the set of facial landmarks, generating a representation of a face for the at least one portion of the face depicted in the one or more images;
generating one or more sticker graphics incorporating the representation of the face, the generating of the one or more sticker graphics comprising generating a scaled version of the representation corresponding to a template graphic; and
generating, by a user device of the first user, a message, directed to a second user, that includes the one or more sticker graphics incorporating the representation of the face of the first user.

2. The method of claim 1, wherein identifying the set of facial landmarks further comprises:
determining one or more distances between two or more facial landmarks of the set of facial landmarks.

3. The method of claim 2, wherein determining the distances further comprises:
determining a first distance between facial landmarks of the set of facial landmarks representing eyes depicted on the portion of the face;
determining a second distance between facial landmarks of the set of facial landmarks representing the eyes and a nose depicted on the portion of the face;
determining a third distance between facial landmarks of the set of facial landmarks representing the eyes and a mouth depicted on the portion of the face; and
determining a fourth distance between facial landmarks of the set of facial landmarks representing the eyes and a chin depicted on the portion of the face.

4. The method of claim 2, wherein determining the one or more characteristics further comprises:
determining a gender of the portion of the face based on the one or more distances between the two or more facial landmarks.

5. The method of claim 2, wherein determining the one or more characteristics further comprises:

determining a race identifier of the portion of the face based on the one or more distances between the two or more facial landmarks; and determining a skin color by identifying an area of interest on the portion of the face and extracting an average color depicted within the area of interest.

6. The method of claim 2, wherein determining the one or more characteristics further comprises:

determining a jaw shape of the portion of the face based on the set of facial landmarks and the one or more distances between the two or more facial landmarks; and fitting a polyline to the jaw shape.

7. The method of claim 2, wherein determining the one or more characteristics further comprises:

identifying one or more iris within the portion of the face; and determining a prevailing color for the one or more iris.

8. The method of claim 7, wherein identifying the one or more iris further comprises:

determining a shape of one or more eyes surrounding the one or more iris;

determining a height of the shape based on the set of facial landmarks; and determining an iris dimension based on the height of the shape of the one or more eyes.

9. The method of claim 2, wherein determining the one or more characteristics further comprises:

determining one or more eyebrow region of the portion of the face; and identifying one or more shape of the one or more eyebrow region.

10. The method of claim 2, wherein determining the one or more characteristics further comprises:

determining a lip region of the portion of the face;

identifying a shape of one or more lips within the lip region; and identifying a prevailing color of the lip region.

11. The method of claim 1, wherein:

the hair volume is determined by:

identifying a first portion of the set of facial landmarks that represents an outline of the face; and computing a distance the hair region extends from the identified portion of the set of facial landmarks that represents the outline of the face to an outer opposing edge of the hair region; and the hair length is determined based on the hair volume and by:

identifying a second portion of the set of facial landmarks that represents a chin; and computing a distance from the hair region to the second portion of the set of facial landmarks that represents the chin.

12. The method of claim 1, wherein determining the one or more characteristics comprises:

selecting a region of the portion of the face where obstructions commonly appear;

determining whether an obstruction is present in the selected region using one or more of the set of facial landmarks; and in response to determining that the obstruction is present, matching the obstruction to a template selected from a set of templates.

13. A system, comprising:

one or more processors; and a non-transitory processor-readable storage medium coupled to the one or more processors and storing processor executable instructions that, when executed by the one or more processors, cause the one or more processors to perform operations comprising:

receiving, by the one or more processors, one or more two-dimensional images depicting at least a portion of a face of a first user;

detecting, by the one or more processors, the portion of the face depicted within the one or more two-dimensional images;

identifying a set of facial landmarks within the portion of the face depicted within the one or more two-dimensional images;

in response to detecting the portion of the face and the set of facial landmarks, determining one or more characteristics representing the portion of the face depicted in the one or more two-dimensional images, the determining comprising:

identifying a set of colors within a hair region of the face;

determining a hair texture for the hair region based on variations in the set of colors that indicate edges, objects or shapes within the hair associated with the hair texture;

comparing a dimension of the hair region to one or more of the set of facial landmarks; and determining hair length or hair volume based on the comparison of the dimension of the hair region to the one or more of the set of facial landmarks;

based on the one or more characteristics and the set of facial landmarks, generating a representation of a face for the at least one portion of the face depicted in the one or more images;

generating one or more sticker graphics incorporating the representation of the face, the generating of the one or more sticker graphics comprising generating a scaled version of the representation corresponding to a template graphic; and generating, by a user device of the first user, a message, directed to a second user, that includes the one or more sticker graphics incorporating the representation of the face of the first user.

14. The system of claim 13, wherein identifying the set of facial landmarks further comprises:

determining a first distance between facial landmarks of the set of facial landmarks representing eyes depicted on the portion of the face;

determining a second distance between facial landmarks of the set of facial landmarks representing the eyes and a nose depicted on the portion of the face;

determining a third distance between facial landmarks of the set of facial landmarks representing the eyes and a mouth depicted on the portion of the face; and determining a fourth distance between facial landmarks of the set of facial landmarks representing the eyes and a chin depicted on the portion of the face.

15. The system of claim 14, wherein determining the one or more characteristics further comprises:

determining a gender of the portion of the face based on one or more of the first distance, the second distance, the third distance, and the fourth distance.

16. A non-transitory processor-readable storage medium storing processor executable instructions that, when executed by a processor of a machine, cause the machine to perform operations comprising:

receiving, by one or more processors, one or more two-dimensional images depicting at least a portion of a face of a first user;

detecting, by the one or more processors, the portion of the face depicted within the one or more two-dimensional images;

identifying a set of facial landmarks within the portion of the face depicted within the one or more two-dimensional images;

in response to detecting the portion of the face and the set of facial landmarks, determining one or more characteristics representing the portion of the face depicted in the one or more two-dimensional images, the determining comprising:

identifying a set of colors within a hair region of the face;

determining a hair texture for the hair region based on variations in the set of colors that indicate edges, objects or shapes within the hair associated with the hair texture;

comparing a dimension of the hair region to one or more of the set of facial landmarks; and determining hair length or hair volume based on the comparison of the dimension of the hair region to the one or more of the set of facial landmarks;

based on the one or more characteristics and the set of facial landmarks, generating a representation of a face for the at least one portion of the face depicted in the one or more images;

generating one or more sticker graphics incorporating the representation of the face, the generating of the one or more sticker graphics comprising generating a scaled version of the representation corresponding to a template graphic; and generating, by a user device of the first user, a message, directed to a second user, that includes the one or more sticker graphics incorporating the representation of the face of the first user.

17. The non-transitory processor-readable storage medium of claim 16, wherein the operations further comprise:

determining a first distance between facial landmarks of the set of facial landmarks representing eyes depicted on the portion of the face;

determining a second distance between facial landmarks of the set of facial landmarks representing the eyes and a nose depicted on the portion of the face;

determining a third distance between facial landmarks of the set of facial landmarks representing the eyes and a mouth depicted on the portion of the face; and determining a fourth distance between facial landmarks of the set of facial landmarks representing the eyes and a chin depicted on the portion of the face.

18. The non-transitory processor-readable storage medium of claim 17, wherein determining the one or more characteristics further comprises:

determining a gender of the portion of the face based on one or more of the first distance, the second distance, the third distance, and the fourth distance.

19. The non-transitory processor-readable storage medium of claim 17, wherein determining the one or more characteristics further comprises:

identifying one or more iris within the portion of the face:

determining a shape of one or more eyes surrounding the one or more iris;

determining a height of the shape based on the set of facial landmarks:

determining an iris dimension based on the height of the shape of the one or more eyes; and determining a prevailing color for the one or more iris.

* * * * *

UNITED STATES PATENT AND TRADEMARK OFFICE
CERTIFICATE OF CORRECTION

PATENT NO. : 10,339,365 B2
APPLICATION NO. : 15/086749
DATED : July 2, 2019
INVENTOR(S) : Gusarov et al.

It is certified that error appears in the above-identified patent and that said Letters Patent is hereby corrected as shown below:

In the Claims

In Column 29, Line 57, in Claim 12, delete "appear:" and insert --appear;-- therefor In Column 30, Line 46, in Claim 14, delete "face:" and insert --face;-- therefor In Column 32, Line 26, in Claim 19, delete "face:" and insert --face;-- therefor In Column 32, Line 30, in Claim 19, delete "landmarks:" and insert --landmarks;-- therefor Signed and Sealed this
Twenty-second Day of December, 2020

Andrei Iancu
*Director of the United States Patent and Trademark Office*